US011874975B2

(12) United States Patent
Kim et al.

(10) Patent No.: US 11,874,975 B2
(45) Date of Patent: Jan. 16, 2024

(54) ELECTRONIC PEN, METHOD OF DRIVING THE SAME, AND DISPLAY DEVICE

(71) Applicant: SAMSUNG DISPLAY CO., LTD., Yongin-si (KR)

(72) Inventors: Hyung Chul Kim, Hwaseong-si (KR); Won Ki Hong, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/051,198

(22) Filed: Oct. 31, 2022

(65) Prior Publication Data
US 2023/0305646 A1 Sep. 28, 2023

(30) Foreign Application Priority Data
Mar. 24, 2022 (KR) .................. 10-2022-0036772

(51) Int. Cl.
*G06F 3/0354* (2013.01)
*G06F 3/038* (2013.01)

(52) U.S. Cl.
CPC ........ *G06F 3/03545* (2013.01); *G06F 3/0383* (2013.01)

(58) Field of Classification Search
CPC .............................. G06F 3/03545; G06F 3/0383
See application file for complete search history.

(56) References Cited

U.S. PATENT DOCUMENTS

| 8,154,536 B2 | 4/2012 | Burstrom et al. |
| 9,304,626 B2 | 4/2016 | Hong et al. |
| 2006/0109260 A1* | 5/2006 | Sui ...................... G06F 3/03542 345/175 |
| 2012/0263381 A1 | 10/2012 | Yoshida |
| 2016/0018905 A1* | 1/2016 | Nagao .................. H04N 9/3179 345/157 |
| 2016/0334889 A1 | 11/2016 | Lee |
| 2019/0294264 A1* | 9/2019 | Tamura ................. G06F 1/3215 |
| 2021/0389831 A1* | 12/2021 | Lee ........................ G06F 3/0386 |

FOREIGN PATENT DOCUMENTS

KR 10-2020-0079250 7/2020

* cited by examiner

*Primary Examiner* — Jonathan A Boyd
(74) *Attorney, Agent, or Firm* — F. Chau & Associates, LLC

(57) ABSTRACT

An electronic pen includes a projector configured to generate a virtual code pattern, a light-emitting unit configured to emit light to a detection area, a light-receiving unit configured to detect light reflected from the detection area, and a code processor configured to control the projector, the light-emitting unit, and the light-receiving unit. The code processor is configured to, when a code pattern is detected in a portion of the detection area, generate the virtual code pattern, which corresponds to a remaining portion of the detection area. The projector is configured to output the virtual code pattern to the remaining portion of the detection area.

20 Claims, 28 Drawing Sheets

| | Col1 | Col2 | Col3 | Col4 | Col5 | Col6 | |
|---|---|---|---|---|---|---|---|
| Row1 | 00 | 01 | 01 | 11 | 10 | 11 | |
| Row2 | 00 | 01 | Null | 10 | 00 | 10 | |
| Row3 | 01 | 01 | 01 | 01 | Null | 10 | |
| Row4 | 01 | 10 | 00 | 00 | 01 | 11 | |
| Row5 | 01 | 01 | 00 | 10 | 01 | 11 | |
| Row6 | 01 | 10 | 11 | 11 | 11 | 01 | |

DC11 (top-left), DC16 (top-right), DC61 (bottom-left), DC66 (bottom-right)

CDP: CP11~CP16

| | Col1 | Col2 | Col3 | Col4 | Col5 | Col6 | |
|---|---|---|---|---|---|---|---|
| DC11 → | 00 | 01 | 01 | 11 | 10 | 11 | ← DC16, Row1 |
| | 00 | 01 | Null | 10 | 00 | 10 | Row2 |
| DC31 → | 01 | 01 | 01 | 01 | Null | 10 | ← DC36, Row3 |
| | 01 | 10 | 00 | 00 | 01 | 11 | Row4 |
| | 01 | 01 | 00 | 10 | 01 | 11 | Row5 |
| DC61 → | 01 | 10 | 11 | 11 | 11 | 01 | Row6, DC66 |

CDP: CP11~CP16, CP21~CP26
VCDP: VCP31~VCP36, VCP41~VCP46,
VCP51~VCP56, VCP61~VCP66

FIG. 24

|      | Col1 | Col2 | Col3 | Col4 | Col5 | Col6 |
|------|------|------|------|------|------|------|
| Row1 | 00   | 01   | 01   | 11   | 10   | 11   |
| Row2 | 00   | 01   | Null | 10   | 00   | 10   |
| Row3 | 01   | 01   | 01   | 01   | Null | 10   |
| Row4 | 01   | 10   | 00   | 00   | 01   | 11   |
| Row5 | 01   | 01   | 00   | 10   | 01   | 11   |
| Row6 | 01   | 10   | 11   | 11   | 11   | 01   |

| | Col1 | Col2 | Col3 | Col4 | Col5 | |
|---|---|---|---|---|---|---|
| Data 1 | 1 | 0 | 1 | 1 | 0 | — Row1 |
| | 1 | 1 | 0 | 1 | 1 | — Row2 |
| Data 2 | 1 | 0 | 1 | 0 | 1 | — Row3 |
| | 0 | 1 | 1 | 1 | 0 | — Row4 |

| | Col1 | Col2 | Col3 | |
|---|---|---|---|---|
| Data 1 | RP1 | 01 | 10 | ---- Row1 |
| | 01 | 00 | 11 | ---- Row2 |
| Data 2 | RP2 | 11 | 01 | ---- Row3 |
| | 01 | 00 | 10 | ---- Row4 |

RP: RP1, RP2

ELECTRONIC PEN, METHOD OF DRIVING THE SAME, AND DISPLAY DEVICE

CROSS-REFERENCE TO RELATED APPLICATION

This application claims priority under 35 U.S.C. § 119 to Korean Patent Application No. 10-2022-0036772, filed on Mar. 24, 2022 in the Korean Intellectual Property Office, the disclosure of which is incorporated by reference herein in its entirety.

TECHNICAL FIELD

Embodiments of the present disclosure relate to an electronic pen, a method of driving the same, and a display device.

DISCUSSION OF RELATED ART

Demands for display devices are continually increasing with the evolution of information-oriented societies. For example, display devices have been applied to various electronic devices such as smartphones, digital cameras, notebook computers, navigation systems, and smart televisions (TVs). Display devices may be flat display devices, such as, for example, liquid crystal display devices, field emission display devices, organic light-emitting display devices, etc.

Recent display devices support touch input made with a user's appendage (e.g., finger) as well as touch input made with an electronic pen (e.g., a stylus pen). In some cases, touch input made with an electronic pen may be more precise than touch input made with a user's appendage.

SUMMARY

Embodiments of the present disclosure provide an electronic pen, a method of driving the same, and a display device which can recognize a code pattern even when the electronic pen detects a part of the code pattern in a portion of a detection area.

According to an embodiment of the present disclosure, an electronic pen includes a projector configured to generate a virtual code pattern, a light-emitting unit configured to emit light to a detection area, a light-receiving unit configured to detect light reflected from the detection area, and a code processor configured to control the projector, the light-emitting unit and the light-receiving unit. The code processor is configured to, when a code pattern is detected in a portion of the detection area, generate a virtual code pattern, which corresponds to a remaining portion of the detection area. The projector is configured to output the virtual code pattern to the remaining portion of the detection area.

The light-receiving unit may be configured to output code pattern image data to the code processor, the code pattern image data corresponding to the code pattern in the portion of the detection area and having a plurality of rows and columns.

The code processor may be configured to calculate first data code values based on the code pattern image data, the first data code values corresponding to the portion of the detection area and having a plurality of rows and columns.

The electronic pen may further include a memory including a plurality of data code groups. Each of the plurality of data code groups includes data code values having a plurality of rows and columns.

The code processor may be configured to detect a data code group including the first data code values from among the plurality of data code groups.

The code processor may be configured to calculate data code values in the detected data code group, except for the first data code values, as second data code values and generate the virtual code pattern based on the second data code values.

The first data code values may include data code values in at least one of the plurality of rows and data code values in at least one of the plurality of columns.

The light-receiving unit may be configured to detect light reflected from a re-detection area that includes the code pattern of the portion of the detection area and the virtual code pattern of the remaining portion of the detection area.

The code processor may be configured to detect a third data code value from the re-detection area, based on a code pattern obtained by combining the code pattern and the virtual code pattern.

The light-emitting unit may be configured to emit infrared light.

The projector may be configured to emit infrared light.

According to an embodiment of the present disclosure, a display device includes a display panel including a code pattern including a plurality of sub-code patterns and a peripheral area disposed around the code pattern, and an electronic pen configured to emit light to the code pattern of the display panel, detect light reflected from the code pattern, and recognize position information according to sub-code patterns detected from the code pattern. The electronic pen includes a code processor configured to, when sub-code patterns among the plurality of sub-code patterns are detected in a portion of a detection area which overlaps at least a part of the code pattern, generate a virtual code pattern corresponding to a remaining portion of the detection area, and a projector configured to output the virtual code pattern to the remaining portion of the detection area.

The display device may further include a light-receiving unit configured to detect light reflected from the detection area. The light-receiving unit is configured to detect light reflected from a re-detection area that includes the code pattern of the portion of the detection area and the virtual code pattern of the remaining portion of the detection area, and the code processor is configured to detect a data code value from the re-detection area, based on a code pattern obtained by combining the code pattern and the virtual code pattern.

According to an embodiment of the present disclosure, a method of driving an electronic pen includes emitting light to a detection area and detecting light reflected from the detection area. The method further includes, when detecting a code pattern in a portion of the detection area, generating a virtual code pattern corresponding to a remaining portion of the detection area. The method further includes outputting the virtual code pattern to the remaining portion of the detection area.

The method of driving an electronic pen may further include outputting code pattern image data corresponding to the code pattern in the portion of the detection area and having a plurality of rows and columns.

The method of driving an electronic pen may further include calculating first data code values based on the code pattern image data, the first data code values corresponding to the portion of the detection area and having a plurality of rows and columns.

Each of a plurality of data code groups may include data code values having a plurality of rows and columns, and the method further includes detecting a data code group including the first data code values from among the plurality of data code groups.

The method of driving an electronic pen may further include calculating data code values in the detected data code group, except for the first data code values, as second data code values, and generating the virtual code pattern based on the second data code values.

The method of driving an electronic pen may further include detecting light reflected from a re-detection area that includes the code pattern of the portion of the detection area and the virtual code pattern of the remaining portion of the detection area.

The method of driving an electronic pen may further include detecting a third data code value from the re-detection area, based on a code pattern obtained by combining the code pattern and the virtual code pattern.

It should be noted that the effects of embodiments of the present disclosure are not limited to those described above, and other effects of embodiments of the present disclosure will be apparent from the following description.

BRIEF DESCRIPTION OF THE DRAWINGS

The above and other aspects and features of the disclosure will become more apparent by describing in detail embodiments thereof with reference to the accompanying drawings, in which:

FIG. 9 is a diagram showing data code values according to the code pattern of FIG. 8.

Figure 13:
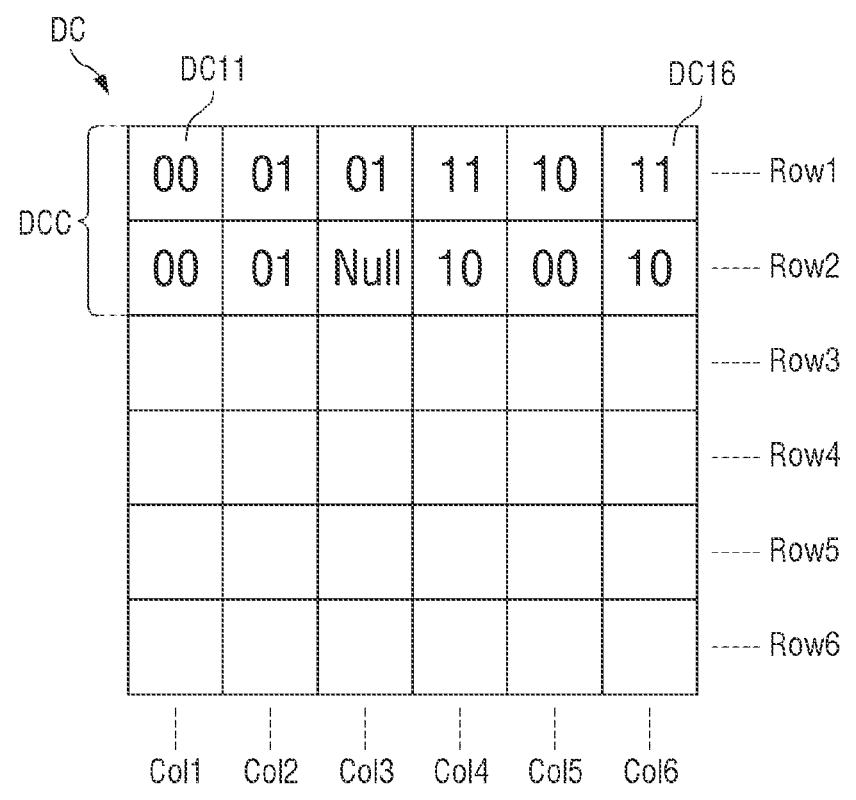

FIG. 13 is a diagram showing data code values according to the code pattern of FIG. 12.

FIG. 15 is a diagram showing data code values according to a code pattern and a virtual code pattern portion.

FIG. 24 is a diagram showing data code values corresponding to the code pattern of FIG. 23 according to an embodiment.

FIG. 26 is a diagram showing data codes corresponding to the code pattern of FIG. 25 according to an embodiment.

FIG. 28 is a diagram showing data codes corresponding to the code pattern of FIG. 27 according to an embodiment.

DETAILED DESCRIPTION OF THE EMBODIMENTS

Figure 1:
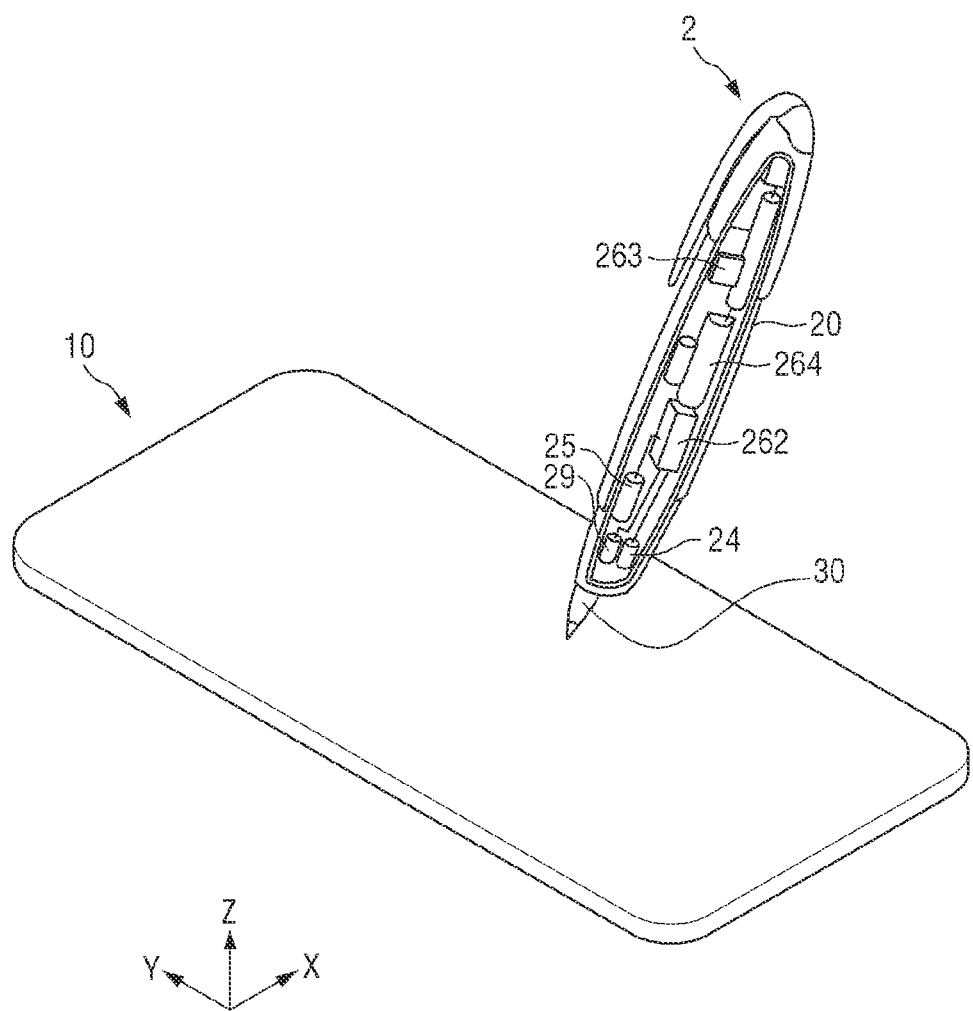
FIG. 1 is a diagram illustrating an electronic pen and a display device according to an embodiment.

Embodiments of the present disclosure will be described more fully hereinafter with reference to the accompanying drawings. Like reference numerals may refer to like elements throughout the accompanying drawings.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Figure 2:
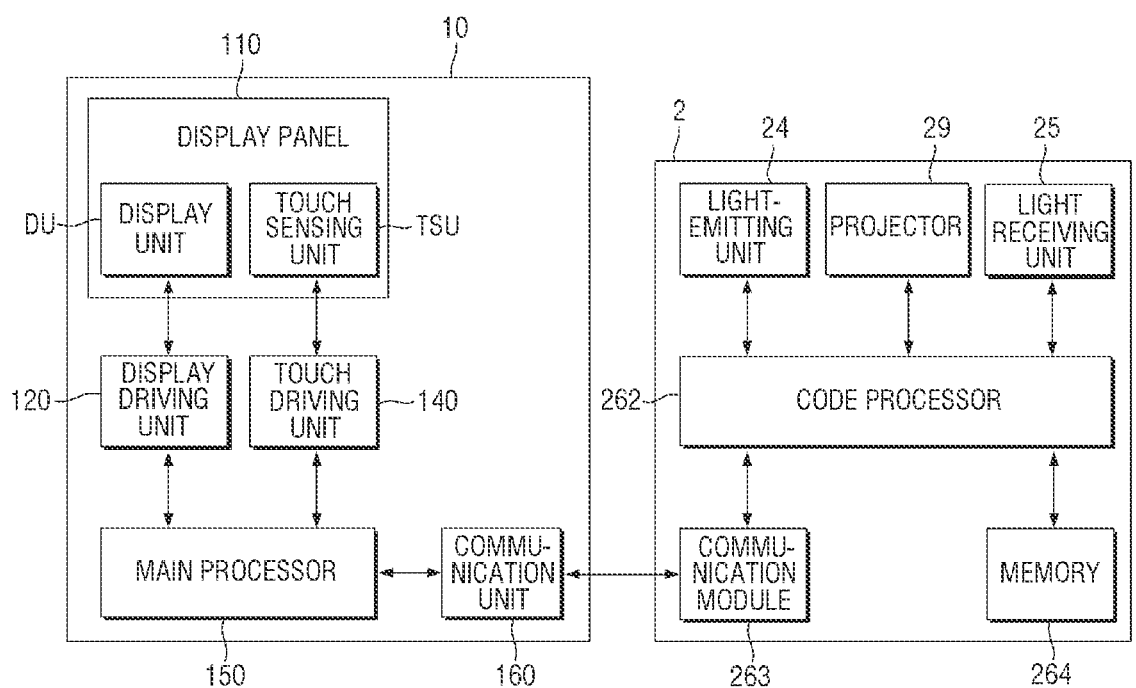
FIG. 2 is a block diagram illustrating an electronic pen and a display device according to an embodiment.

FIG. 1 is a diagram illustrating an electronic pen and a display device according to an embodiment. FIG. 2 is a block diagram illustrating an electronic pen and a display device according to an embodiment.

Referring to FIGS. 1 and 2, a display device 10 according to an embodiment 10 includes a display panel 110, a display driving unit 120, a touch driving unit 140, a main processor 150, and a communication unit 160.

The display device 10 may use an electronic pen 2 as a touch input device. The electronic pen 2, which is a pen that detects display light of the display panel 110 reflected from the display panel 110 using an optical method, may detect a code pattern included in the display panel 110 based on the detected light and may generate coordinate data.

The display panel 110 may include a display unit DU configured to display an image, and a touch sensing unit TSU configured to sense an appendage, such as a finger, and the electronic pen 2. The display unit DU may include a plurality of pixels and display an image through the plurality of pixels. The display unit DU may display an image including code patterns through the plurality of pixels.

The touch sensing unit TSU may include a plurality of touch electrodes to detect a touch input from a user in a capacitive manner. Here, at least some touch electrodes may include a code pattern (CDP in FIG. 23) to detect a touch input from the electronic pen 2.

The code pattern (CDP in FIG. 23) of the display panel 110 may include code patterns that are cut according to a specific criterion for forming a specific code regarding position information. The code patterns may correspond to values of predetermined data codes. Detailed configuration features of the touch sensing unit TSU in addition to the display panel 110, the code pattern (CDP in FIG. 23), and detailed structures of the code patterns, will be described below in greater detail with reference to the accompanying drawings.

The display driving unit 120 may output signals and voltages for driving the display unit DU. The display driving unit 120 may provide data voltages to data lines. The display driving unit 120 may provide a power voltage to a power line and provide gate control signals to a gate driver.

The touch driving unit 140 may be connected to the touch sensing unit TSU. The touch driving unit 140 may provide touch driving signals to the plurality of touch electrodes of the touch sensing unit TSU and may detect variations of capacitances of the touch electrodes. The touch driving unit 400 may detect the presence of touch input and calculate the touch coordinates of the touch input of the user based on variations in the capacitances of the touch electrodes.

The main processor 150 may control all functions of the display device 10. For example, the main processor 150 may provide digital video data to the display driving unit 120 such that the display panel 110 displays an image. For example, the main processor 150 may receive touch data from the touch driving unit 140 and determine coordinates of the user's touch, and then may generate digital video data according to the touch coordinates or execute an application indicated by an icon displayed at the user's touch coordinates. As another example, the main processor 150 may receive coordinate data from the electronic pen 2 and determine touch coordinates of a touch input from the electronic pen 2, and then may generate digital video data according to the touch coordinates or execute an application indicated by an icon displayed at the touch coordinates of the electronic pen 2.

The communication unit 160 may communicate wired or wirelessly with an external device. For example, the communication unit 160 may transmit and receive a communication signal to and from a communication module 263 of the electronic pen 2. The communication unit 160 may receive coordinate data composed of data codes from the electronic pen 2, and may provide the coordinate data to the main processor 150.

The electronic pen 2 according to an embodiment includes a body portion 20 and a nib portion 30. The electronic pen 2 may be formed in the shape of a writing instrument such as a fountain pen with the body portion 20 and the nib portion 30 that form the overall outer appearance of the electronic pen 2. However, embodiments of the present disclosure are not limited thereto, and the electronic pen 2 may have various shapes and structures.

The body portion 20 of the electronic pen 2 includes a light-emitting unit 24, a light-receiving unit 25, a projector 29, and a controller 26.

The light-emitting unit 24 may be disposed on the body portion 20 at a position in proximity to the nib portion 30. The light-emitting unit 24 may emit light in one direction. For example, the light-emitting unit 24 may use at least one infrared light source to output infrared light from one end of the body portion 20 in one direction of the nib portion 30. At least one infrared light source module included in the light-emitting unit 24 may be configured as an infrared light-emitting diode (LED) array having a matrix structure. The light-emitting unit 24 may also be referred to herein as a light-emitting light source or a light source.

The light-receiving unit 25 is disposed on the body portion 20 at a position in proximity to the nib portion 30 of the electronic pen 2 and detects an image signal associated with a code pattern (CDP in FIG. 8) included in the display panel 110 of the display device 10. For example, the light-receiving unit 25 may detect infrared light reflected from sub-code patterns VCP of the code pattern (CDP in FIG. 8) with an infrared camera. Also, in addition to the infrared rays reflected from the code pattern (CDP in FIG. 8) included in the display panel 110, the light-receiving unit 25 may detect infrared light reflected from a virtual code pattern (VCDP in FIG. 16) generated by the projector 29 with the infrared camera. The light-receiving unit 25 may provide code pattern image data of the detected code pattern (CDP in FIG. 8) to a code processor 262.

The light-receiving unit 25 may include a lens system (251 in FIG. 3), a barrel (252 in FIG. 3), and an image sensor unit (253 in FIG. 3), and may also be referred to herein as a light detector or an infrared light detector.

The lens system 251 may focus infrared rays to transmit an infrared image to the barrel 252. The barrel 252 may provide a space for transmitting the infrared image from the lens system 251 to the image sensor unit 253. Also, the barrel 252 may focus the infrared image so that the image sensor unit 253 can recognize the infrared image. The optical image sensor unit 253 may convert the optical image formed by the lens system 251 into an electrical image signal and output the electrical image signal.

Figure 16:
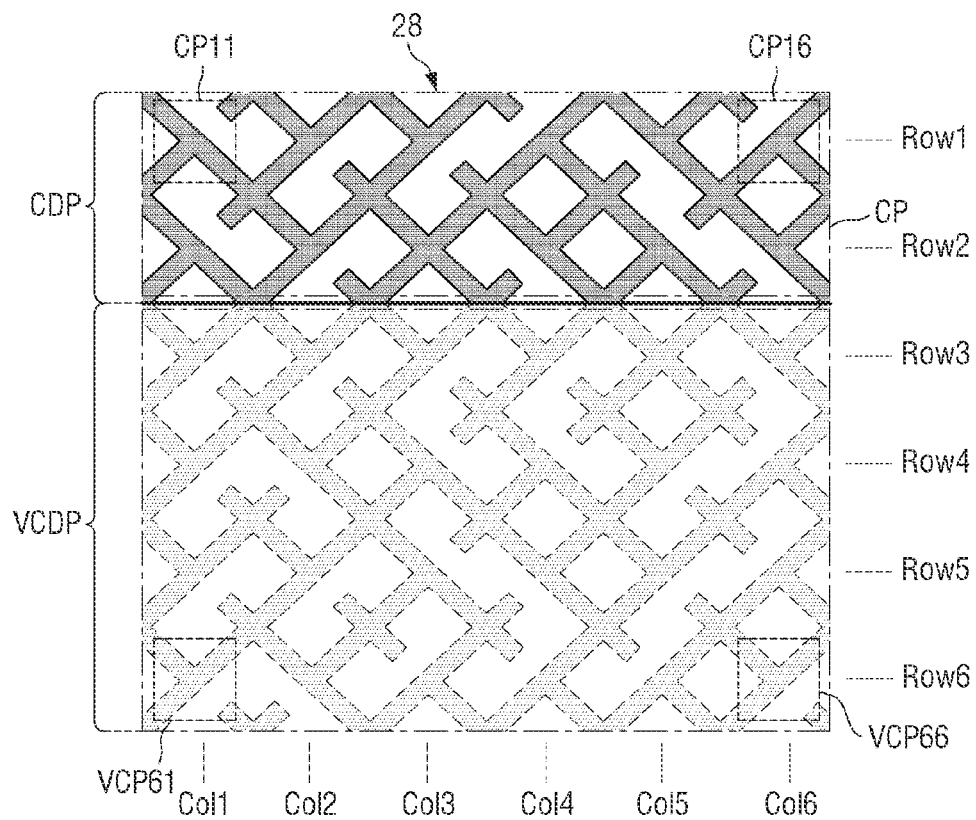
FIG. 16 is a plan view showing the detection area, the code pattern and the virtual code pattern of FIG. 15.
Figure 16:
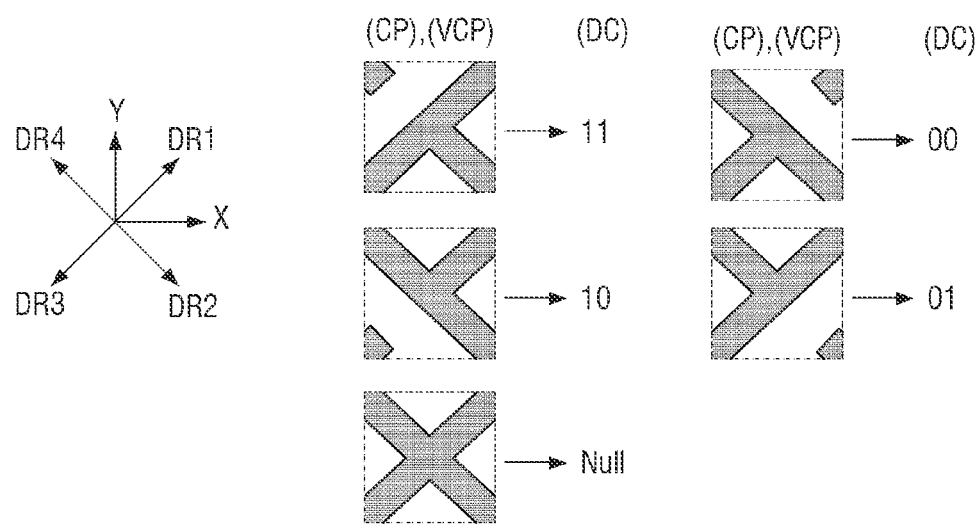

The image sensor unit 253 may be formed of an array in a matrix structure as in the infrared LED array, and may provide the code processor 262 with the code pattern image data according to the type of infrared rays reflected from the code pattern (CDP in FIG. 8) of the code pattern and a virtual code pattern (VCDP in FIG. 16). In this way, the light-receiving unit 25 of the electronic pen 2 may continuously detect a code pattern included in at least some areas of the touch sensing unit TSU according to the user's control and movement, and may continuously generate code pattern image data and provide the generated code pattern image data to the code processor 262.

The projector 29 may be disposed on the body portion 20. The projector 29 may emit the virtual code pattern VCDP generated by the controller 26 in one direction. For example, the projector 29 may use at least one infrared light source to output the virtual code pattern VCDP from one end of the body portion 20 in one direction of the nib portion 30.

The projector 29 may project an image to a set area. In this case, the projector 29 may be implemented in a form including, for example, a light source, a transmissive display device, a projection lens, etc. For example, the projector 29 may be implemented as at least one of an LED projector or a laser projector, but is not limited thereto. Here, the LED projector may pass light generated from a lamp through a transmissive LED panel to gather or combine images into one and form an image in a projection area through a projection lens. The laser projector may form an image in a projection area through a laser. The projector 29 may also be referred to herein as a light source, or an infrared light source.

The controller 26 includes the code processor 262, the communication module 263, and the memory 264.

The code processor 262 may determine that a point in time when a pressing detection signal is input is a point in time when the electronic pen 2 is used. When the pressing detection signal is input, the code processor 262 may continuously receive image data of the code pattern from the light-receiving unit 25. For example, the code processor 262 may continuously receive the code pattern image data and may identify the structures and shapes of the code patterns. The code processor 262 may extract or generate data code values (DC in FIG. 9) that correspond to the structures and shapes of the code patterns, and may extract or generate coordinate data by combining the data code values (DC in FIG. 9). The code processor 262 may transmit the generated coordinate data to the display device 10 through the communication module 263. For example, the code processor 262 may receive the code pattern image data and generate and convert data codes that respectively correspond to the code patterns, thereby promptly generating the coordinate data without performing complicated computations and corrections.

In addition, the code processor 262 may generate a virtual data code value (DCV in FIG. 15) used for generating a virtual code pattern VCDP and the virtual code pattern VCDP. For example, the code processor 262 may detect an area in which the code pattern CP is not detected, based on the code pattern image data received from the light-receiving unit 25. The code processor 262 may generate the virtual data code values (DCV in FIG. 15) such that the virtual code pattern VCDP is generated in the area in which the code pattern CP is not detected. Also, the code processor 262 may generate the virtual code pattern based on the virtual data code values (DCV in FIG. 15). The code processor 262 may output the virtual code pattern VCDP to the projector 29.

The communication module 263 may communicate wired or wirelessly with an external device. For example, the communication module 263 may transmit and receive a communication signal to and from the communication unit 160 of the display device 10. The communication module 263 may receive coordinate data composed of the data code values (DC in FIG. 9) from the code processor 262, and may provide the coordinate data to the communication unit 160.

The memory 264 may store data utilized for driving the electronic pen 2. The image data of the code patterns and data code groups including data code values that respectively correspond to the code patterns are stored in the memory 264. Also, coordinate data associated with the data code groups are stored in the memory 264. The memory 264 may share each image data, the data code groups that respectively correspond to the code patterns, and the coordinate data associated with the respective data code groups with the code processor 262. Accordingly, the code processor 262 may combine the data codes through the data code values stored in the memory 264 and the coordinate data, and may extract or generate coordinate data that corresponds to the combined data code.

Figure 3:
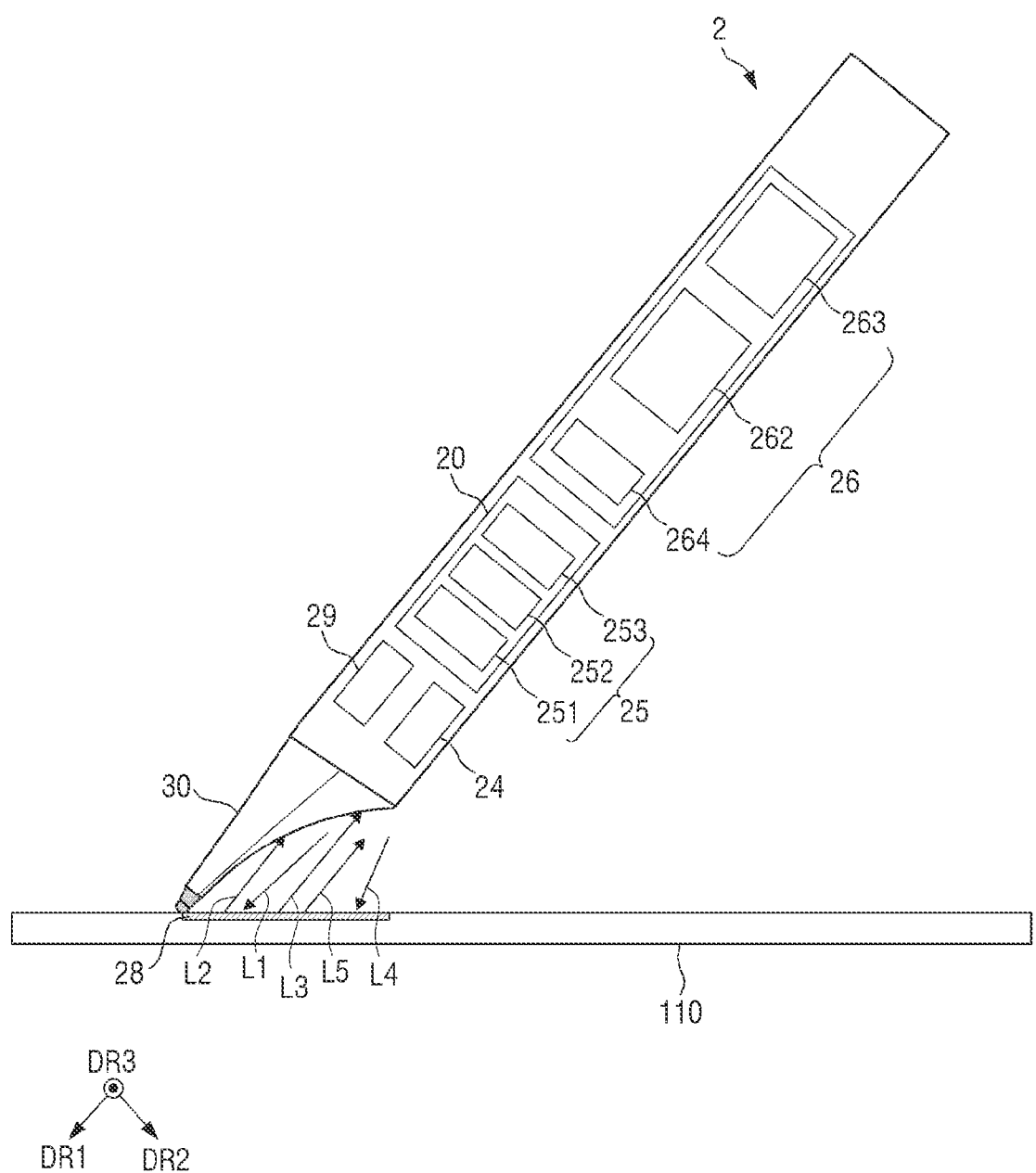
FIG. 3 is a block diagram illustrating a configuration of an electronic pen according to an embodiment.

FIG. 3 is a block diagram illustrating a configuration of an electronic pen according to an embodiment.

Referring to FIG. 3, an external appearance of an electronic pen 2 may be formed by the body portion 20 and the nib portion 30.

The body portion 20 may form an outer side surface of the electronic pen 2 in a cylindrical shape. For example, the body portion 20 may be formed in a rod shape elongated in one direction for serving as a handle and may have a writing instrument shape as a whole. the controller 26, the light-emitting unit 24, the light-receiving unit 25, and the projector 29 may be disposed in the body portion 20.

The nib portion 30 may be disposed at one end of the body portion 20. The nib portion 30 allows light to be emitted from the light-emitting unit 24 and the projector 29 toward the display panel 110, and allows a light receiving path of reflected light reflected from the display panel 110 (or a traveling path of the reflected light) to be formed. For example, the nib portion 30 may be formed to allow the light-receiving unit 25 to receive the light displayed on the display panel 110 and the light reflected from the display panel 110.

The light-emitting unit 24 may emit infrared light toward an end on one side of the nib portion 30. The infrared light incident in the direction of the nib portion 30 may travel to the display panel 110. Light L1 emitted from the light-emitting unit 24 may be reflected from the display panel 110. Light L2 reflected from the display panel 110 or light L3 emitted from the display panel 110 may travel to the light-receiving unit 25.

The projector 29 may emit infrared light toward the end on one side of the nib portion 30. The infrared light incident in the direction of the nib portion 30 may travel toward the display panel 110 and may be reflected therefrom. Light L4 emitted from the projector 29 may include a virtual code pattern VCDP. Light L5 reflected from the display panel 110 may travel to the light-receiving unit 25.

The light-receiving unit 25 may detect the infrared light from the direction of the end on one side of the nib portion 30. The light-receiving unit 25 may detect the light L2 reflected from the display panel 110 irradiated by the light-emitting unit 24, the light L3 emitted from the display panel 110, or the light L5 emitted from the projector 29 and then reflected. The light-receiving unit 25 may include a detection area 28 for detecting the light described above. The detection area 28 is described further below with reference to FIGS. 4 to 16.

Figure 4:
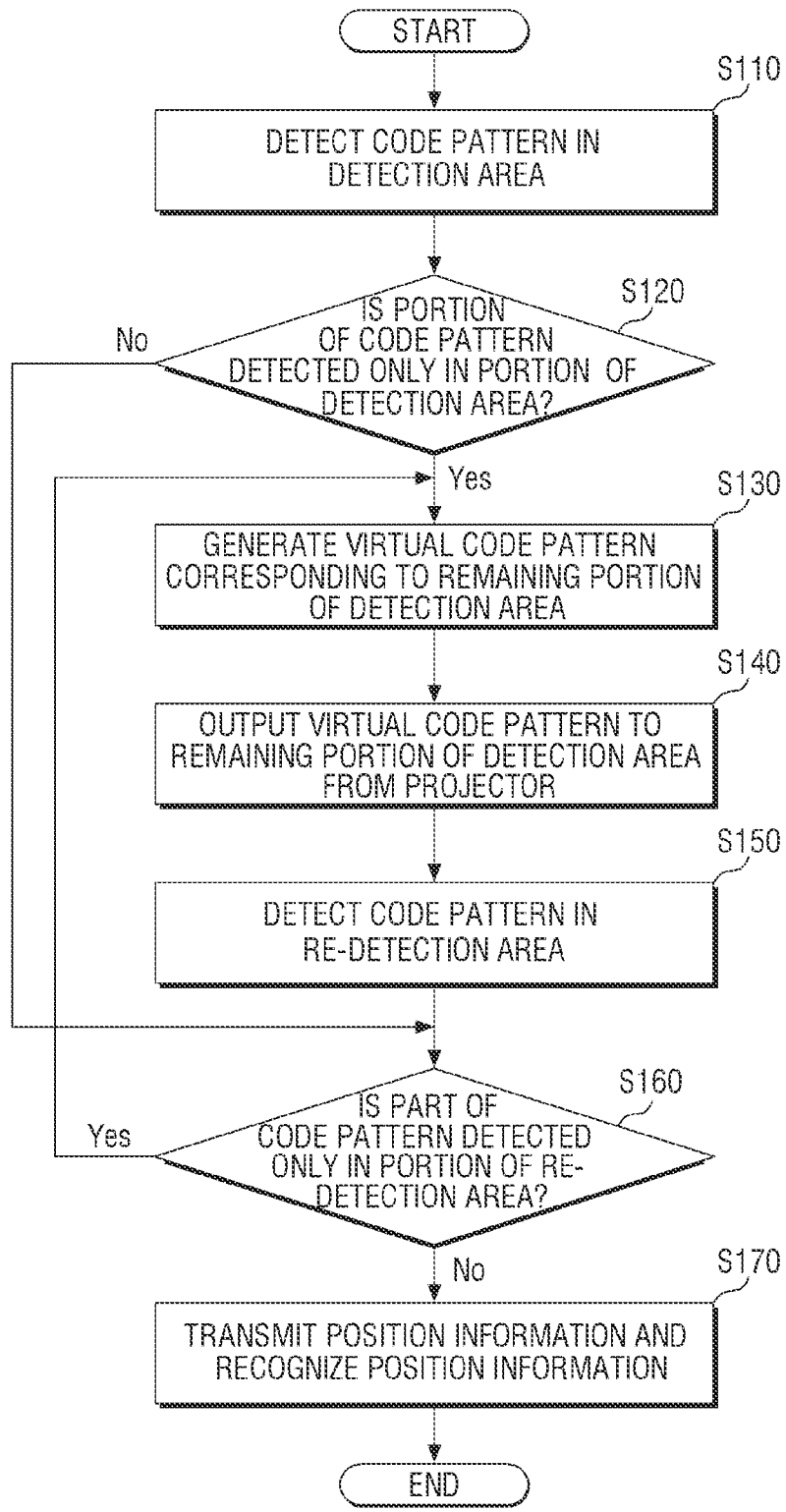
FIG. 4 is a flowchart illustrating a method of generating a virtual code pattern of an electronic pen according to an embodiment.
Figure 5:
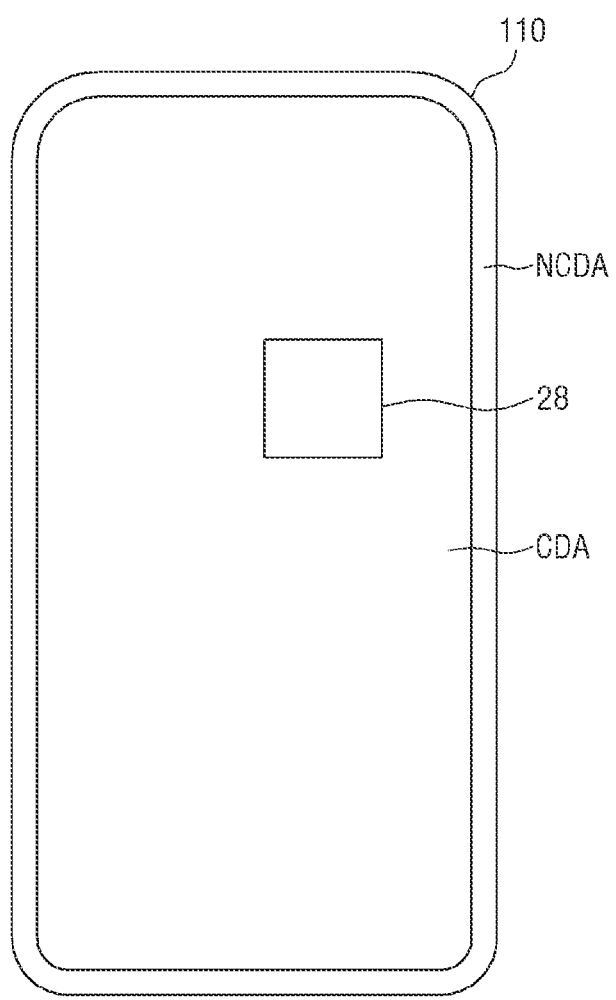
FIGS. 5 and 6 are diagrams illustrating examples of a detection area of an electronic pen according to an embodiment.
Figure 6:
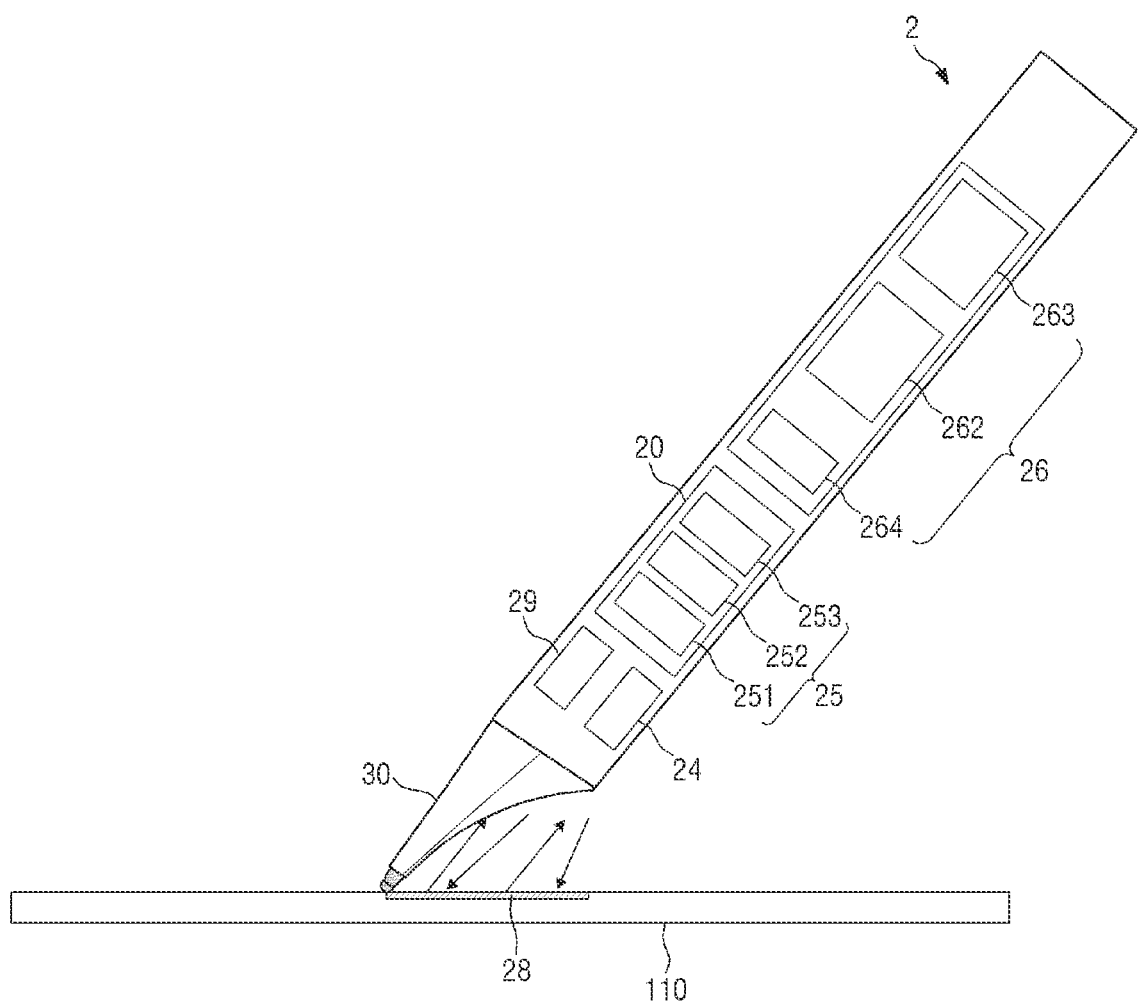
Figure 6:
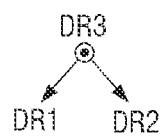
Figure 7:
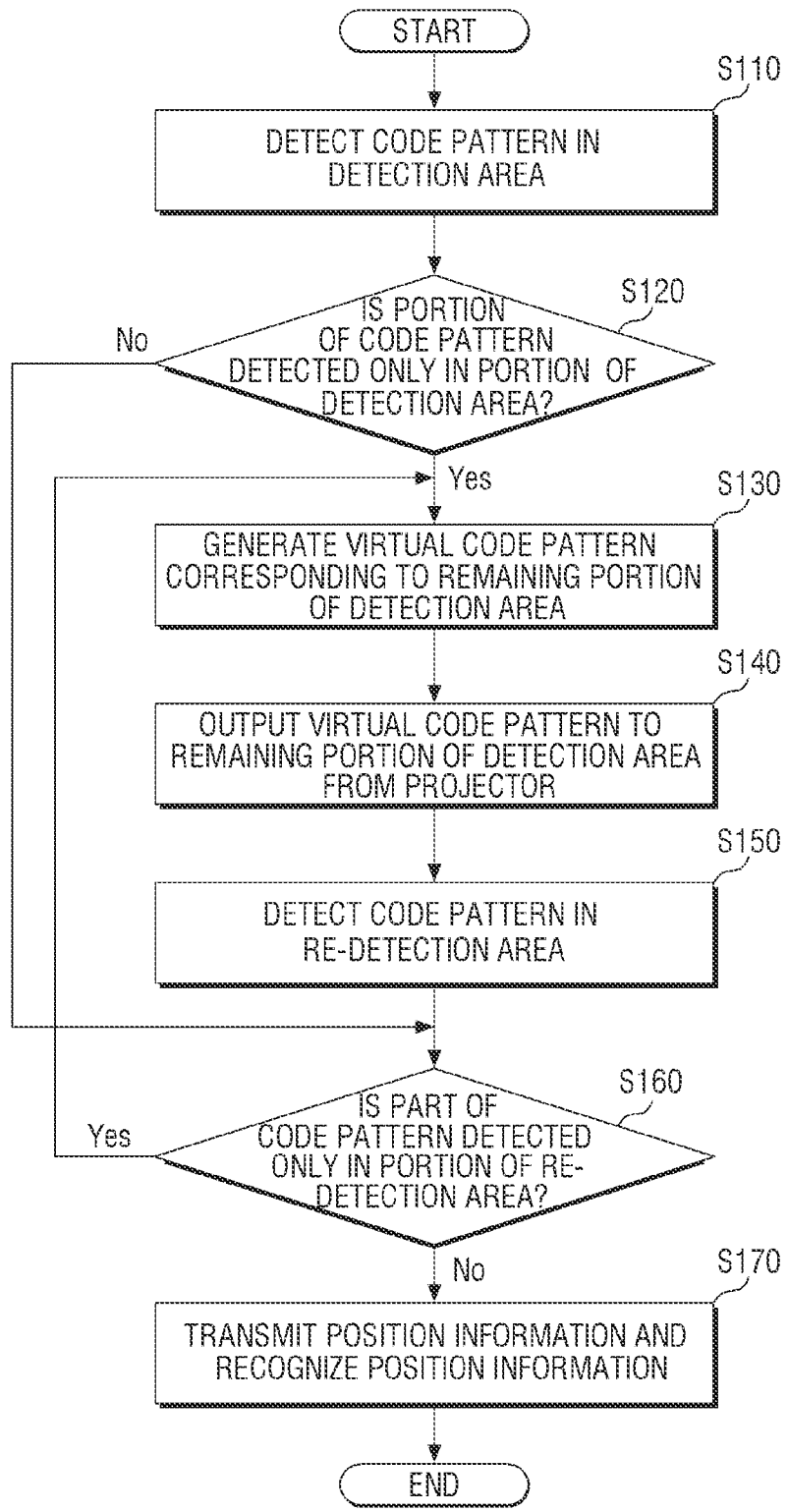
FIG. 7 is a flowchart illustrating a process of determining whether a code pattern is included according to an embodiment.
Figure 8:
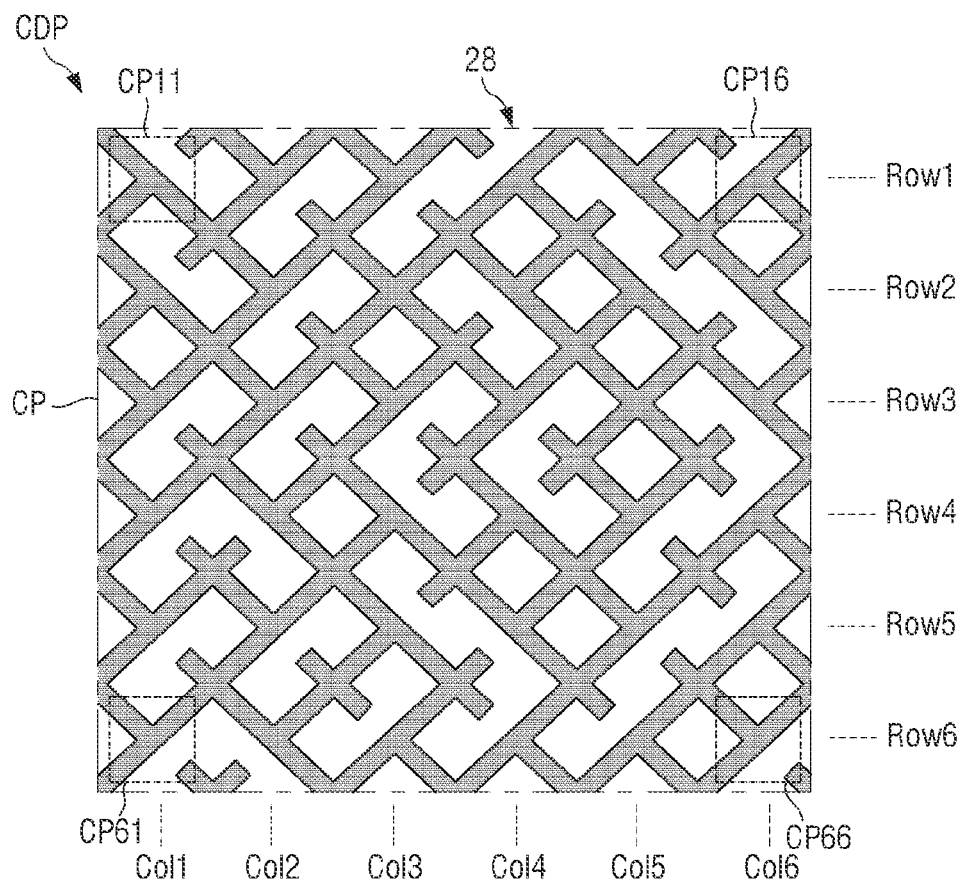
FIG. 8 is a plan view showing a detection area and a code pattern according to an embodiment.
Figure 8:
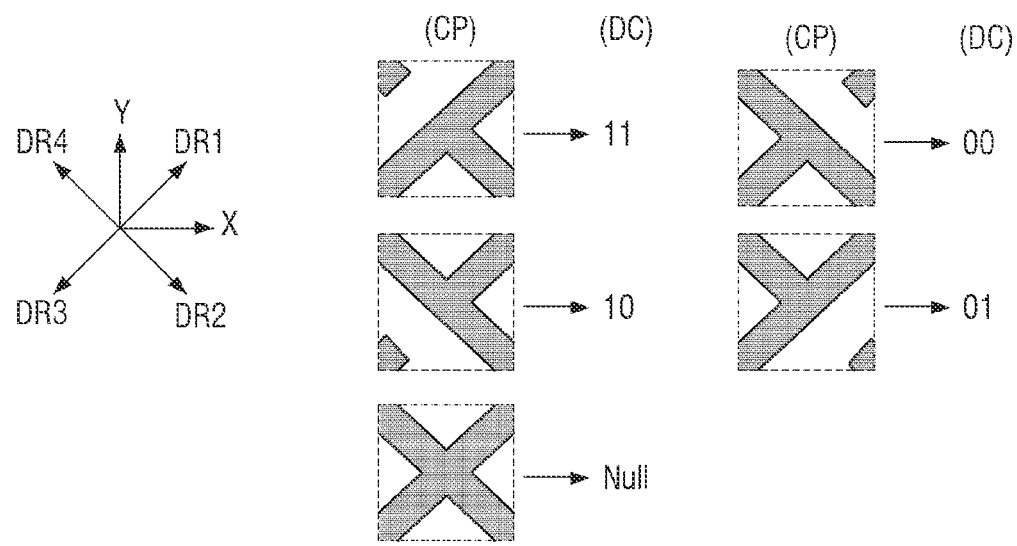
Figure 10:
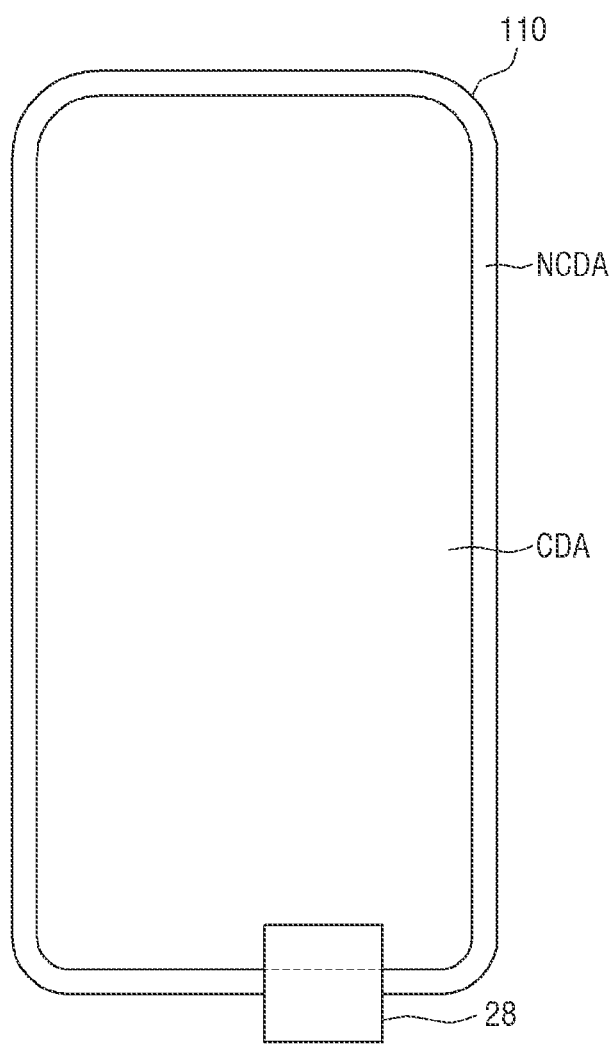
FIGS. 10 and 11 are diagrams illustrating examples of a detection area of an electronic pen according to an embodiment.
Figure 11:
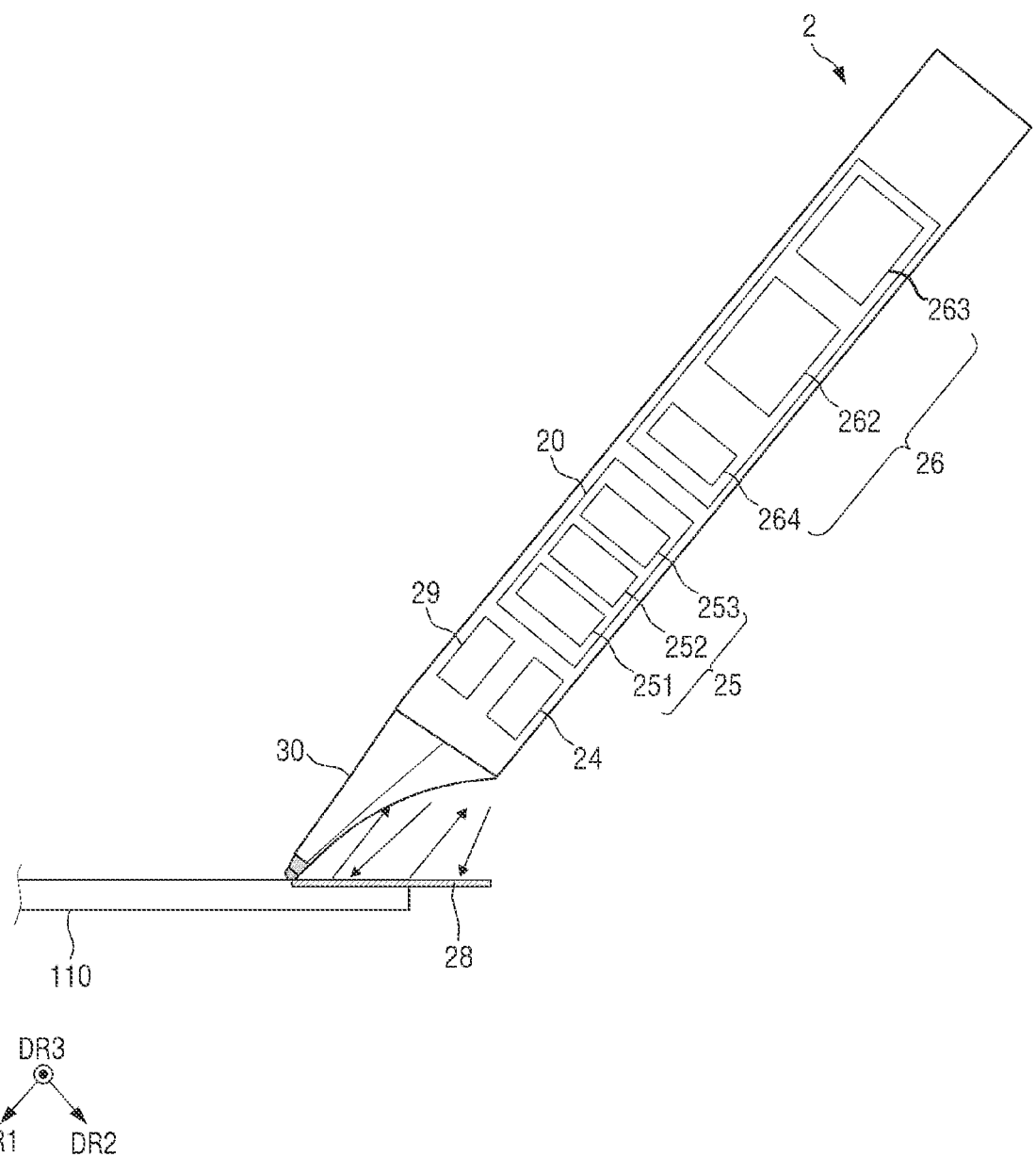
Figure 12:
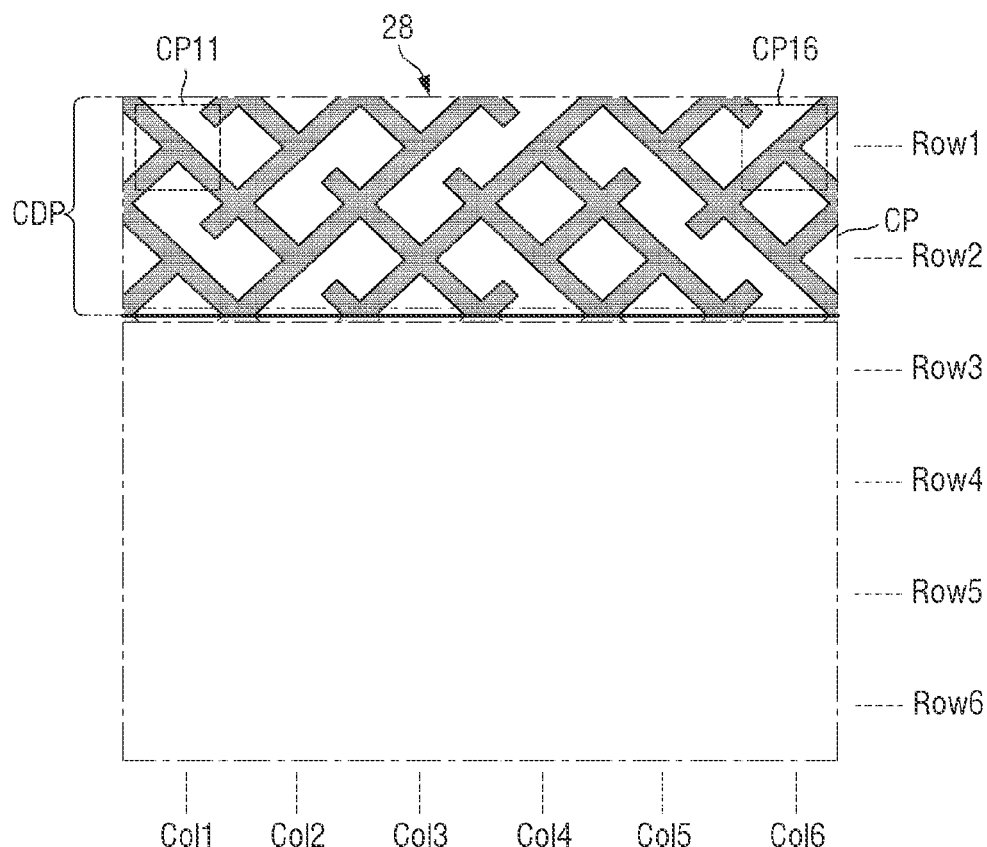
FIG. 12 is a plan view showing a detection area and a code pattern according to an embodiment.
Figure 12:
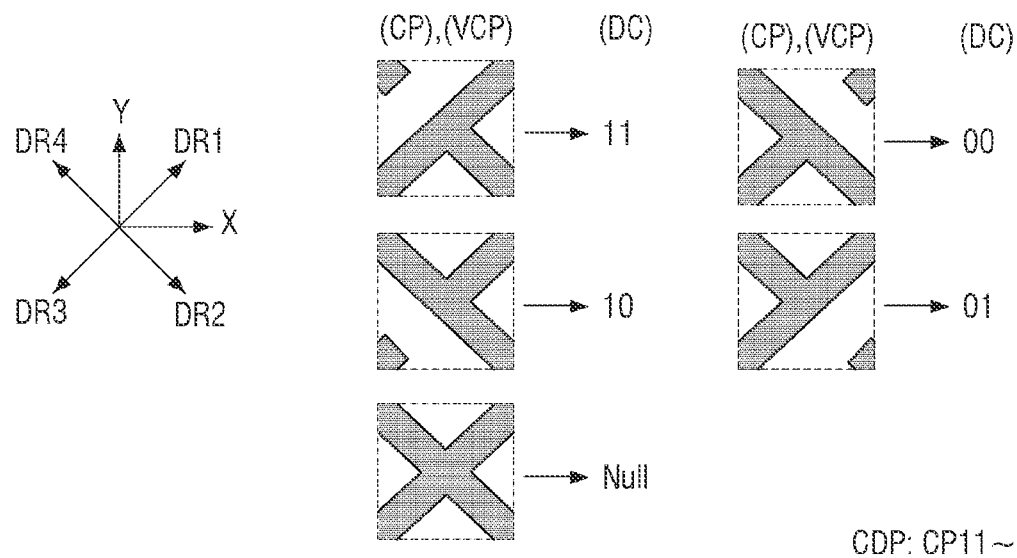
Figure 14:
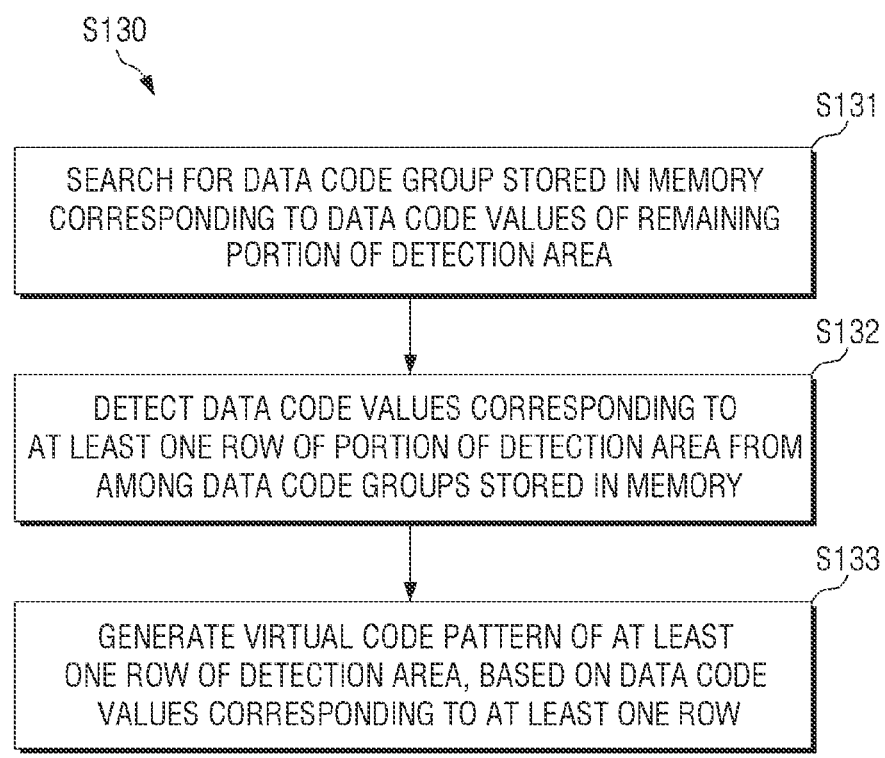
FIG. 14 is a flowchart illustrating a process of generating a virtual code pattern according to an embodiment.

FIG. 4 is a flowchart illustrating a method of generating a virtual code pattern of an electronic pen according to an embodiment. FIGS. 5 and 6 are diagrams illustrating examples of a detection area of an electronic pen according to an embodiment. FIG. 7 is a flowchart illustrating a process of determining whether a code pattern is included according to an embodiment. FIG. 8 is a plan view showing a detection area and a code pattern according to an embodiment. FIG. 9 Is a diagram showing data code values according to the code pattern of FIG. 8. FIGS. 10 and 11 are diagrams illustrating examples of a detection area of an electronic pen according to an embodiment. FIG. 12 is a plan view showing a detection area and a code pattern according to an embodiment. FIG. 13 is a diagram showing data code values according to the code pattern of FIG. 12. FIG. 14 is a flowchart illustrating a process of generating a virtual code pattern according to an embodiment. FIG. 15 is a diagram showing data code values according to a code pattern and a virtual code pattern portion. FIG. 16 is a plan view showing the detection area, the code pattern and the virtual code pattern of FIG. 15.

Hereinafter, a method of generating a virtual code pattern VCDP of the electronic pen 2 will be described in detail with reference to FIGS. 4 to 16.

First, referring to FIG. 4, the light-receiving unit 25 detects a code pattern in the detection area 28 (S110).

The light-receiving unit 25 may detect light in a code pattern area CDA of the display panel 110. The light-receiving unit 25 may detect an image signal related to the code pattern area CDA included in the display panel 110 of the display device 10. The light-receiving unit 25 may detect infrared light reflected from the code pattern CDP in the code pattern area CDA with an infrared camera.

The light-receiving unit 25 may include the detection area 28 for detecting light. That is, the light-receiving unit 25 may have the detection area 28 for detecting the code pattern CDP. The light-receiving unit 25 may detect light in the code pattern area CDA within the detection area 28. However, a part of the code pattern CDP of the display panel 110 may not be included in a portion of the detection area 28. For example, as shown in FIGS. 5 and 6, the detection area 28 may include the code pattern area CDA of the display panel 110. Alternatively, as shown in FIGS. 10 and 11, a portion of the detection area 28 may include the coded pattern area CDA of the display panel 110, and the remaining portion of the detection area 28 may include a non-code pattern area NCDA.

The detection area 28 may have a quadrilateral shape. For example, the detection area 28 may extend in an X-axis direction from the nib portion 30. In addition, the detection area 28 may extend in a Z-axis direction from the nib portion 30. The detection area 28 may be a square-shaped area extending in the X-axis direction and the Z-axis direction from the nib portion 30. For example, in an embodiment, the detection area 28 may include twenty-five to forty-nine sub-code patterns CP. Alternatively, the detection area 28 may have a square shape with each side having a length of about 20 mm to about 30 mm. However, the detection area 28 may have various shapes and sizes, without being limited to the number of the plurality of sub-code patterns CP included in the detection area 28 and the length of each side of the detection area 28.

The light-receiving unit 25 may provide code pattern image data to the code processor 262 according to the type of infrared rays reflected from the code pattern CDP in the code pattern area CDA. The light-receiving unit 25 may continuously detect the code pattern CDP included in the code pattern area CDA, continuously generate the code pattern image data of the code pattern CDP, and provide the generated code pattern image data to the code processor 262.

Then, the code processor 262 determines whether a part of the code pattern CDP is detected only in a portion of the detection area 28 (S120).

Referring to FIG. 7, the code processor 262 receives the code pattern image data from the light-receiving unit (S121).

Referring to FIG. 8, the code pattern image data includes a plurality of sub-code patterns CP. The plurality of sub-code patterns CP may be formed of some of a plurality of touch electrodes (SEN in FIG. 20) of the display device. The plurality of sub-code patterns CP may be arranged along a plurality of rows and columns. For example, the plurality of sub-code patterns CP may be arranged along six rows and six columns. That is, the plurality of sub-code patterns CP may be arranged in a 6-by-6 matrix. However, the disclosure is not limited thereto and the plurality of sub-code patterns CP may be arranged in, for example, a 5-by-5 matrix or a 7-by-7 matrix. The plurality of sub-code patterns CP will be described below in greater detail with reference to FIGS. 17 to 28.

Then, the code processor 262 calculates a data code value DC based on the code pattern image data in the detection area 28 (S122).

Referring to FIGS. 8 and 9, the plurality of sub-code patterns CP may be cut according to a specific criterion and thus may have position information. The plurality of sub-code patterns CP may correspond to preset data code values DC. For example, the plurality of sub-code patterns CP may each be provided by cutting one of a plurality of stems extending from intersections of the touch electrodes (SEN in FIG. 20). The plurality of stems of at least some touch electrodes SEN may extend in the first to fourth directions DR1, DR2, DR3, and DR4 from the intersections, and the stem extending in one of the first to fourth directions DR1, DR2, DR3, and DR4 may be cut. The cutting direction of the stem may correspond to the data code value DC of the data code group preset in the memory. For example, the sub-code pattern CP arranged in an $m^{th}$ row (hereinafter, m is a positive integer) and an $n^{th}$ column (hereinafter, n is a positive integer) may correspond to the data code value DC arranged in the $m^{th}$ row and the $n^{th}$ column.

For example, the code pattern CDP obtained by cutting a stem in the first direction DR1 may correspond to a data code value DC of [00]. The code pattern CDP obtained by cutting a stem in the second direction DR2 may correspond to a data code value DC of [01]. The code pattern CDP obtained by cutting a stem in the third direction DR3 may correspond to a data code value DC of [10]. The code pattern CDP obtained by cutting a stem in the fourth direction DR4 may correspond to a data code value DC of [11].

An $11^{th}$ code pattern CP11 placed in the first row Row1 and the first column Col1 may be provided by cutting the stem in the first direction DR1 and an $11^{th}$ data code DC11 may have a value of [00]. A $61^{st}$ code pattern CP61 placed in the sixth row Row6 and the first column Col1 may be provided by cutting the stem in the second direction DR2 and a $61^{st}$ data code DC61 may have a value of [01]. A $62^{nd}$ code pattern CP62 placed in the sixth row Row6 and the second column Col2 may be provided by cutting the stem in the third direction DR3 and a $62^{nd}$ data code DC62 may have a value of [10]. A 16$^{th}$ code pattern CP16 placed in the first row Row1 and the sixth column Col6 may be provided by cutting the stem in the fourth direction DR4 and a 16$^{th}$ data code DC16 may have a value of [11].

The plurality of sub-code patterns CP may further include a conducting pattern in which a plurality of stems extending from the intersection are not cut. The conducting pattern may not have a data code value DC (Null). For example, a 32$^{nd}$ code pattern CP 32 placed in the third row Row3 and the second column Col2 may be a conducting pattern, and a 32$^{nd}$ data code DC32 may not have a value.

Then, the code processor 262 determines whether a data code value DC is detected only in a portion of the detection area 28 (S123).

The code processor 262 may determine, based on the calculated data code value DC, whether the data code value DC is detected only in a portion of the detection area 28. For example, the code processor 262 may determine whether the code pattern CDP is detected in a portion of the detection area 28 and the code pattern CDP is not detected in the remaining portion of the detection area 28. For example, FIG. 9 shows a plurality of data code values DC in six rows and six columns. FIG. 13 shows a plurality of data code values DC in two rows and six columns. It may be determined that the data code values DC as shown in FIG. 9 are detected in the entire detection area 28. Alternatively, it may be determined whether only the real data code values DCC including the 11$^{th}$ to 16$^{th}$ data code values DC11 to DC16 and 21$^{st}$ to 26$^{th}$ data code values DC21 to DC26 as shown in FIG. 13 are detected in a portion of the detection area 28. In other words, it may be determined that 31$^{st}$ to 36$^{th}$ data code values DC31 to DC36, 41$^{st}$ to 46$^{th}$ data code values DC41 to DC46, 51$^{st}$ to 66$^{th}$ data code values DC51 to DC56, and 61$^{st}$ to 66$^{th}$ data code values DC61 to DC66 are not detected in the remaining portion of the detection area 28 in FIG. 13.

Then, referring back to FIG. 4, when the code processor determines that a part of the code pattern CDP is not detected only in a portion of the detection area 28 (NO in S120), the electronic pen 2 may transmit position information and recognize the position information through the code pattern CDP information.

When the code pattern CDP is detected in the entire detection area 28, the position information of the electronic pen 2 may be recognized through the data code value DC corresponding to the code pattern data image. For example, referring to FIG. 9, when the code pattern CDP is detected not only in a portion of the detection area 28 but also in the remaining portion of the detection area 28, the electronic pen 2 may recognize the position information through the data code value DC and transmit the position information to the display device.

On the other hand, when a part of the code pattern CDP is detected only in a portion of the detection area (YES in S120), the code processor 262 generates a virtual code pattern VCDP corresponding to the remaining portion of the detection area 28 (S130).

Referring to FIG. 14, the code processor 262 searches for a data code group that corresponds to the real data code values DCC (S131).

The code processor 262 searches for the data code group, based on real data code values DCC of a portion of the detection area 28, from data code groups having a plurality of rows and columns stored in the memory. For example, in the case of the real data code values DCC of FIG. 13, when only the 11$^{th}$ to 16$^{th}$ data code value DC11 to DC16 and the 21$^{st}$ to 26$^{th}$ data code values DC21 to DC26 are detected in a portion of the detection area 28, the code processor 262 may search for a data code group that corresponds to the 11$^{th}$ to 16$^{th}$ data code value DC11 to DC16 and the 21$^{st}$ to 26$^{th}$ data code values DC21 to DC26.

Then, the code processor 262 detects the data code value DC that corresponds to the portion of the detection area 28 from among the data code groups (S132).

Referring to FIGS. 15 and 16, for example, the code processor 262 may detect virtual data code values DCV including the 31$^{st}$ to 36$^{th}$ data code values DC31 to DC36, the 41$^{st}$ to 46$^{th}$ data code values DC41 to DC46, the 51$^{st}$ to 56$^{th}$ data code values DC51 to DC56, and the 61$^{st}$ to 66$^{th}$ data code values DC61 to DC66 in the remaining portion of the detection area 28 based on the data code group that corresponds to the real data code values DCC.

Then, referring back to FIG. 14, based on the data code value DC corresponding to the portion of the detection area 28, the code processor 262 generates the virtual code pattern VCDP that corresponds to the remaining portion of the detection area 28 (S133).

The code processor 262 may generate virtual sub-code patterns VCP that correspond to the remaining portion of the detection area 28, based on the detected virtual data code values DCV. The plurality of virtual sub-code patterns VCP may be cut according to a specific criterion and may have position information. The plurality of virtual sub-code patterns VCP may correspond to the virtual data code values DCV. The plurality of virtual sub-code patterns VCP correspond to the virtual data code values DCV in substantially the same manner as the code pattern CDP, and thus, a description thereof will be omitted.

Then, referring back to FIG. 4, the projector 29 outputs the virtual code pattern VCDP to the remaining portion of the detection area 28 (S140).

The projector 29 may receive virtual code pattern image data including the plurality of virtual sub-code patterns VCP from the code processor 262. The projector 29 may generate an image including the virtual code pattern VCDP in the remaining portion of the detection area 28, based on the virtual code pattern image data. For example, as shown in FIG. 16, the projector 29 may receive the virtual code pattern image data from the code processor 262 and generate an image including the virtual code pattern VCDP, which includes 31" to 36$^{th}$ virtual sub-code patterns VCP31 to VCP36, 41$^{st}$ to 46$^{th}$ virtual sub-code patterns VCP41 to VCP46, 51$^{st}$ to 56$^{th}$ virtual sub-code patterns VCP51 to VCP56, and 61$^{st}$ to 6$^{th}$ virtual sub-code patterns VCP61 to VCP66. However, the number of virtual sub-code patterns VCP is not limited thereto, and may vary depending on the range of the detection area 28.

Then, the light-receiving unit 25 may re-detect the code pattern CDP in a re-detection area 28 (S150), and determine whether a part of the code pattern CDP is detected only in a portion of the detection area 28 (S160).

The light-receiving unit 25 may detect light reflected from the re-detection area 28 including the code pattern CDP of a portion of the detection area 28 and the virtual code pattern VCDP of the remaining portion of the detection area 28. The re-detection area 28 may be substantially the same area as the detection area 28 except that the virtual code pattern VCDP is included. In addition, the code processor 262 may detect a third data code value DC based on a code pattern CDP obtained by combining the code pattern CDP and the virtual code pattern VCDP from the re-detection area 28.

Lastly, the electronic pen 2 may transmit the position information and transmit the position information (S170).

The code processor 262 may recognize the position information of the electronic pen 2 by extracting coordinate data of the electronic pen 2 based on the third data code value DC.

In an embodiment, when a part of the code pattern CDP is detected only in a portion of the detection area 28, the position information of the electronic pen 2 cannot be recognized. That is, when the detection area 28 has a part in which the code pattern CDP is not included, the position information of the electronic pen 2 cannot be recognized. Therefore, the code processor 262 may generate a virtual code pattern VCDP in the remaining portion of the detection area 28 based on the code pattern CDP detected in the portion of the detection area 28. The projector 29 may output the virtual code pattern VCDP so that the light-receiving unit 25 can detect the code pattern CDP including the code pattern CDP and the virtual code pattern VCDP in the entire detection area 28.

Thus, according to an embodiment of the present disclosure, the electronic pen 2 may generate the virtual code pattern VCDP based on the code pattern CDP so that the code pattern CDP can be recognized even when the electronic pen 2 detects a part of the code pattern CDP in the portion of the detection area 28.

Figure 17:
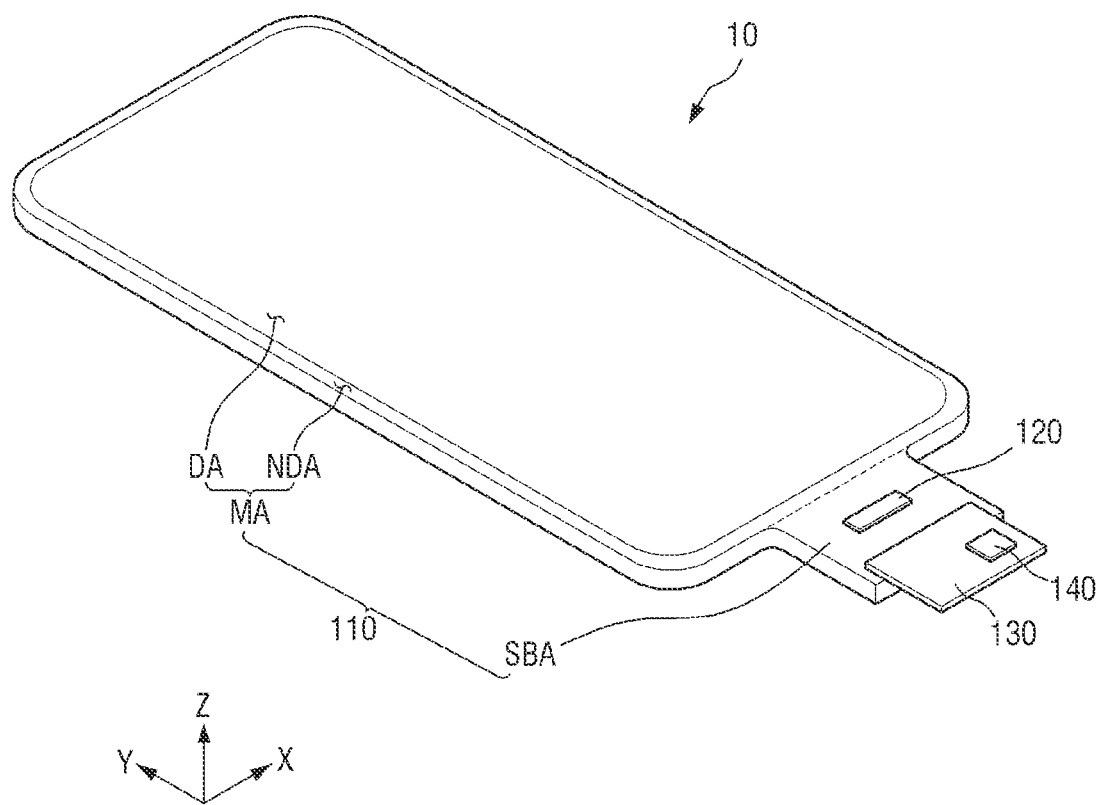
FIG. 17 is a perspective view showing in detail a display device according to an embodiment.

FIG. 17 is a perspective view showing a configuration of the display device shown in FIGS. 1 and 2 according to an embodiment.

Referring to FIG. 17, the display device 10 may be applied to a portable electronic device, such as, for example, a mobile phone, a smartphone, a tablet personal computer, a mobile communication terminal, an electronic notebook, an electronic book, a portable multimedia player (PMP), a navigation device, an ultra-mobile PC (UMPC), etc. For example, the display device 10 may be applied as a display part of a television, a notebook computer, a monitor, a billboard, or an Internet-of-Things (IoT) device. As another example, the display device 10 may be applied to a wearable device, such as, for example, a smartwatch, a watch phone, a glasses-type display, and a head-mounted display (HMD). As another example, the display device 10 may be applied to a center information display fascia, or a carbon dashboard, a room mirror display replacing car side mirrors, or an entertainment display placed on the back surface of each of front seats which is an entertainment system for passengers in the back seats of a vehicle.

The display device 10 may have a planar shape similar to a quadrangular shape. For example, the display device 10 may have a planar shape similar to a quadrangular shape having short sides (relative to long sides in an X-axis direction and long sides (relative to the short sides) in a Y-axis direction. Each corner where a short side extending in the X-axis direction meets a long side extending in the Y-axis direction may be rounded with a predetermined curvature or may be right-angled. However, the planar shape of the display device 10 is not limited to the quadrangular shape. For example, the planar shape of the display device 10 may be any suitable shape such as, for example, another polygonal shape, a circular shape, an oval shape, and/etc.

The display device 10 may include the display panel 110, the display driving unit 120, a circuit board 130, and the touch driving unit 140.

The display panel 110 may include a main area MA and a sub-area SBA.

The main area MA includes a display area DA provided with pixels to display an image, and a non-display area NDA disposed around the display area DA. The display area DA may emit light through a plurality of emission areas or opening areas. The display panel 100 may include pixel circuits including switching elements, a pixel defining film defining emission areas or opening areas, and self-light-emitting elements.

The non-display area NDA may be disposed outside the display area DA. For example, the non-display area NDA may be defined as an edge area of the main area MA of the display panel 110. The non-display area NDA may include a scan driving unit providing scan signals to scan lines, and fan-out lines connecting the display driving unit 120 and the display area DA.

The sub-area SBA may protrude from one side of the main area MA. The sub-area SBA may include a flexible material that is bendable, foldable, or rollable. For example, when the sub-area SBA is bent, the sub-area SBA may overlap the main area MA in the thickness direction (e.g., Z-axis direction). The sub-area SBA may include the display driving unit 120 and a pad unit, which is connected to the circuit board 130. In some embodiments, the sub-area SBA is not provided, and the display driving unit 120 and the pad unit may be disposed in the non-display area NDA.

The display driving unit 120 may output signals and voltages for driving the display panel 110. The display driving unit 120 may provide data voltages to data lines. The display driving unit 120 may provide a power voltage to a power line and provide gate control signals to a gate driver. The display driving unit 120 may be formed as an integrated circuit (IC) and may be mounted on the display panel 110, for example, in a chip-on-glass (COG) or chip-on-plastic (COP) manner or via ultrasonic bonding. The display driving unit 120 may be disposed, for example, in the sub-area SBA. When the sub-area SBA is bent, the display driving unit 120 may overlap the main area MA in the thickness direction (e.g., Z-axis direction). In an embodiment, the display driving unit 120 may be mounted on the circuit board 130.

The circuit board 130 may be attached onto the pad unit of the display panel 110 via, for example, an anisotropic conductive film (ACF). Lead lines of the circuit board 130 may be electrically connected to the pad unit of the display panel 110. The circuit board 300 may be, for example, a flexible printed circuit board (FPCB), a printed circuit board (PCB), or a flexible film such as a chip-on-film (COF).

The touch driving unit 140 may be mounted on the circuit board 130. The touch driving unit 140 may be connected to a touch sensing unit of the display panel 110. The touch driving unit 140 may provide touch driving signals to a plurality of touch electrodes of the touch sensing unit and may detect variations in capacitances of the touch electrodes. For example, the touch driving signals may be pulse signals having a predetermined wavelength. The touch driving unit 400 may detect the presence of touch input and calculate the touch coordinates of the touch input based on variations in the capacitances of the touch electrodes. The touch driving unit 400 may be formed as an integrated circuit (IC).

Figure 18:
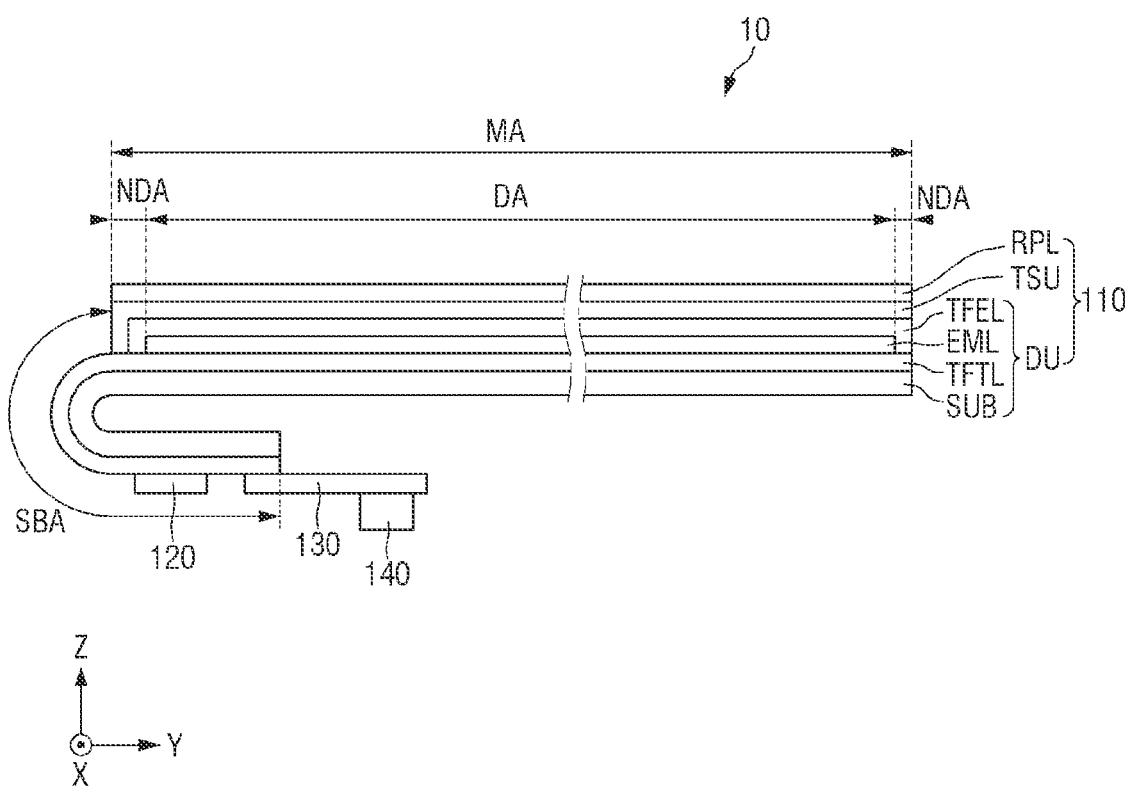
FIG. 18 is a cross-sectional view showing the display device of FIG. 17 according to an embodiment.

FIG. 18 is a cross-sectional view showing the display device of FIG. 17 according to an embodiment.

Referring to FIG. 18, the display panel 110 may include a display unit DU, a touch sensing unit TSU, and an anti-reflection layer RPL. The display unit DU may include a substrate SUB, a thin-film transistor layer TFTL, a light-emitting element layer EML, and an encapsulation layer TFEL.

The substrate SUB may be a base substrate or a base member. The substrate SUB may be a flexible substrate that is bendable, foldable, or rollable. For example, the substrate SUB may include a glass material or a metal material, but is not limited thereto. As another example, the substrate SUB may include a polymer resin, such as polyimide (PI).

The thin film transistor layer TFTL may be disposed on the substrate SUB. The thin film transistor layer TFTL may include a plurality of thin film transistors that form the pixel circuits of pixels. The thin film transistor layer TFTL may include, for example, gate lines, data lines, power supply lines, gate control lines, and fan-out lines which connect the display driving unit 200 and the data lines. The thin film transistor layer TFTL may also include lead lines which connect the display driving unit 120 and the pad unit. Each of the thing film transistors may include a semiconductor region, a source electrode, a drain electrode, and a gate electrode. For example, the gate driving unit may include thin film transistors when the gate driving unit is formed on one side of the non-display area NDA of the display panel 110.

The thin film transistor layer TFTL may be in the display area DA, the non-display area NDA, and the sub-area SBA. The thin film transistors, gate lines, data lines, and power supply lines of the thin film transistor layer TFTL may be disposed in the display area DA. The gate control lines and fan-out lines of the thin film transistor layer TFTL may be disposed in the non-display area NDA. The lead lines of the thin film transistor layer TFTL may be disposed in the sub-area SBA.

The light-emitting element layer EML may be disposed on the thin film transistor layer TFTL. The light-emitting element layer EML may include a plurality of light-emitting elements (each of which includes a first electrode, an emission layer, and a second electrode sequentially stacked) to emit light, and a pixel-defining film which defines pixels. The light-emitting elements of the light-emitting element layer EML may be disposed in the display area DA.

The emission layer may be, for example, an organic emission layer of an organic material. The emission layer may include, for example, a hole transport layer, an organic light-emitting layer, and an electron transport layer. As the first electrodes receive a predetermined voltage via the thin film transistors of the thin film transistor layer TFTL and the second electrodes receive a cathode voltage, holes and electrons may move to the organic emission layers respectively through the hole transport layers and the electron transport layers and may be combined together in the emission layers to emit light. For example, the first electrodes may be anode electrodes and the second electrodes may be cathode electrodes, but the disclosure is not limited thereto.

As another example, the plurality of light-emitting elements may include quantum-dot light-emitting diodes including quantum-dot light-emitting layers or inorganic light-emitting diodes including an inorganic semiconductor.

The encapsulation layer TFEL may cover the top surface and side surfaces of the light-emitting element layer EML to protect the light-emitting element layer EML. The encapsulation layer TFEL may include at least one inorganic film and at least one organic film for encapsulating the light-emitting element layer EML.

The touch sensing unit TSU may be disposed on the encapsulation layer TFEL. The touch sensing unit TSU may include a plurality of touch electrodes and touch lines. The touch electrodes may detect a touch input from a user in a capacitive manner. The touch lines may connect the touch electrodes and the touch driving unit 140. For example, the touch sensing unit TSU may detect touch input from the user in a self-capacitive manner or a mutual capacitance manner.

As another example, the touch sensing unit TSU may be disposed on a separate substrate disposed on the display unit DU. In this case, the substrate that supports the touch sensing unit TSU may be a base member that encapsulates the display unit DU.

The plurality of touch electrodes of the touch sensing unit TSU may be disposed in a touch sensor area that overlaps the display area DA. The touch lines of the touch sensing unit TSU may be disposed in a touch peripheral area that overlaps the non-display area NDA.

The anti-reflection layer RPL may be disposed on the touch sensing unit TSU. The anti-reflection layer RPL may be attached onto the touch sensing unit TSU by an optically clear adhesive (OCA) film or an optically clear resin (OCR). For example, the anti-reflection layer RPL may include a linear polarizer and a phase retardation film such as a $\lambda/4$ (quarter-wave) plate. The phase retardation film and the linear polarizer may be sequentially disposed on the touch sensing unit TSU.

The sub-area SBA of the display panel 110 may protrude from one side of the main area MA. The sub-area SBA may include a flexible material that is bendable, foldable, or rollable. For example, when the sub-area SBA is bent, the sub-area SBA may overlap the main area MA in the thickness direction (e.g., Z-axis direction). The sub-area SBA may include the display driving unit 120 and a pad unit, which is connected to the circuit board 130.

Figure 19:
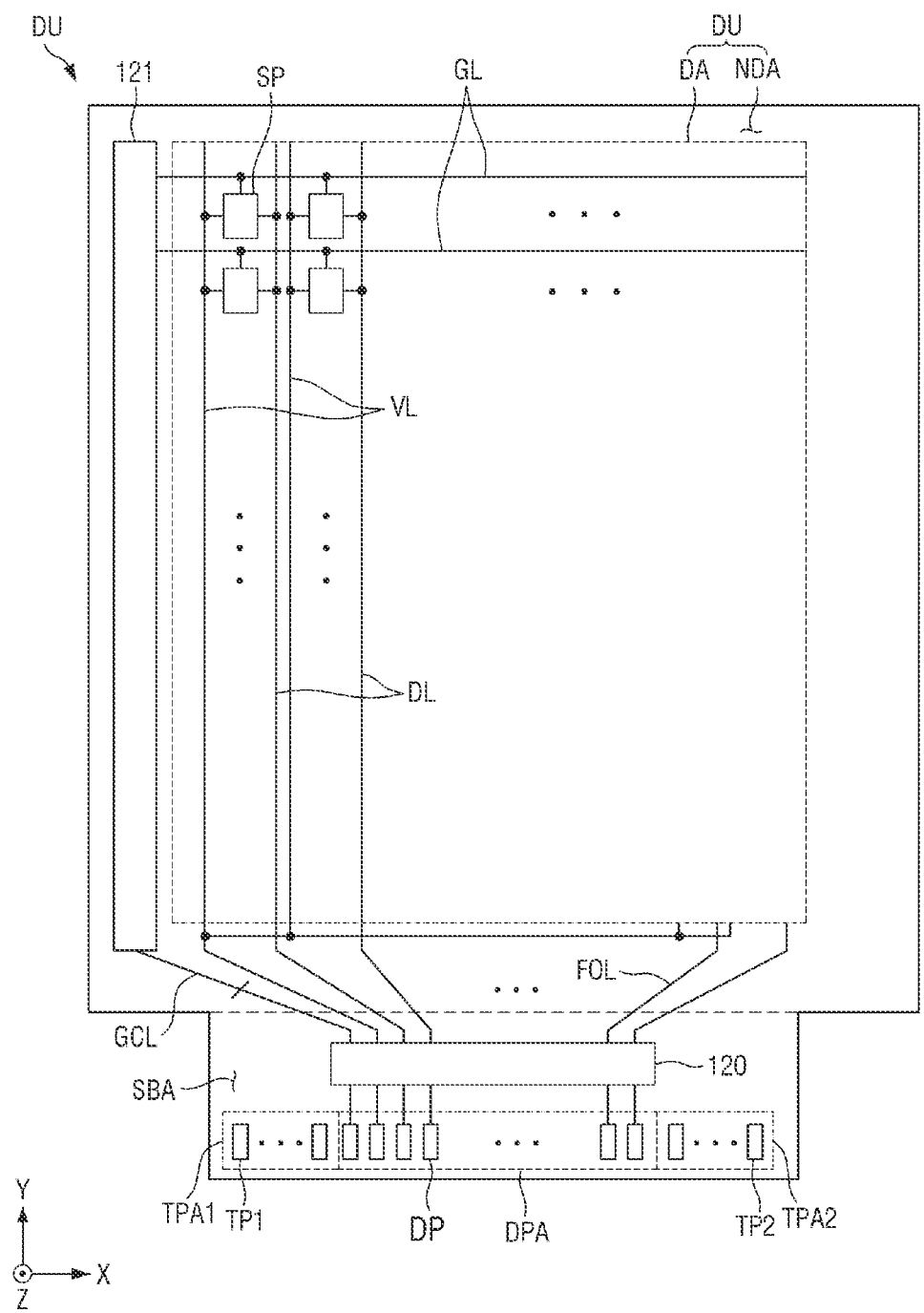
FIG. 19 is a layout view of a display unit of a display device according to an embodiment.

FIG. 19 is a plan view of the display unit of the display device according to an embodiment.

Referring to FIG. 19, the display unit DU may include the display area DA and the non-display area NDA.

The display area DA is an area where an image is displayed and may be defined as a central area of the display panel 110. The display area DA may include a plurality of pixels SP, a plurality of gate lines GL, a plurality of data lines DL, and a plurality of power lines VL. Each of the plurality of pixels SP may be defined as a minimum unit that outputs light.

The plurality of gate lines GL may provide a gate signal received from a gate driving unit 121 to the plurality of pixels SP. The plurality of gate lines GL may extend in the X-axis direction and may be spaced apart from one another in the Y-axis direction intersecting the X-axis direction.

The plurality of data lines DL may provide a data voltage received from the display driving unit 120 to the plurality of pixels SP. The plurality of data lines DL may extend in the Y-axis direction and may be spaced apart from one another in the X-axis direction.

The plurality of power lines VL may provide a power voltage received from the display driving unit 120 to the plurality of pixels SP. Here, the power voltage may be at least one of a driving voltage, an initialization voltage, or a reference voltage. The plurality of power lines VL may extend in the Y-axis direction and may be spaced apart from one another in the X-axis direction.

The non-display area NDA may surround the display area DA. The non-display area NDA may include the gate driving unit 12, fan-out lines FOL, and gate control lines GCL. The gate driving unit 121 may generate a plurality of gate signals based on the gate control signal, and may sequentially provide the plurality of gate signals to the plurality of gate lines GL according to a set order.

The fan-out lines FOL may extend from the display driving unit 120 to the display area DA. The fan-out lines FOL may provide the data voltage received from the display driving unit 120 to the plurality of data lines DL.

The gate control lines GCL may extend from the display driving unit 120 to the gate driving unit 121. The gate control lines GCL may provide the gate control signal received from the display driving unit 120 to the gate driving unit 121.

The sub-area SBA may include the display driving unit 120, a display pad area DPA, and first and second touch pad areas TPA1 and TPA2.

The display driving unit 120 may output signals and voltages for driving the display panel 110 to the fan-out lines FOL. The display driving unit 120 may provide a data voltage to the data lines DL through the fan-out lines FOL. The data voltage may be provided to the plurality of pixels SP, and may determine the luminance of the plurality of pixels SP. The display driving unit 120 may provide a gate control signal to the gate driving unit 121 through the gate control lines GCL.

The display pad area DPA, the first touch pad area TPA1, and the second touch pad area TPA2 may be disposed at edges of the sub-area SBA. The display pad area DPA, the first touch pad area TPA1, and the second touch pad area TPA2 may be electrically connected to the circuit board 130 using a low-resistance, high-reliability material such as, for example, an anisotropic conductive film or SAP.

The display pad area DPA may include a plurality of display pad units DP. The plurality of display pad units DP may be connected to the main processor 150 through the circuit board 130. The plurality of display pad units DP may be connected to the circuit board 130 to receive digital video data, and may provide digital video data to the display driving unit 120.

Figure 20:
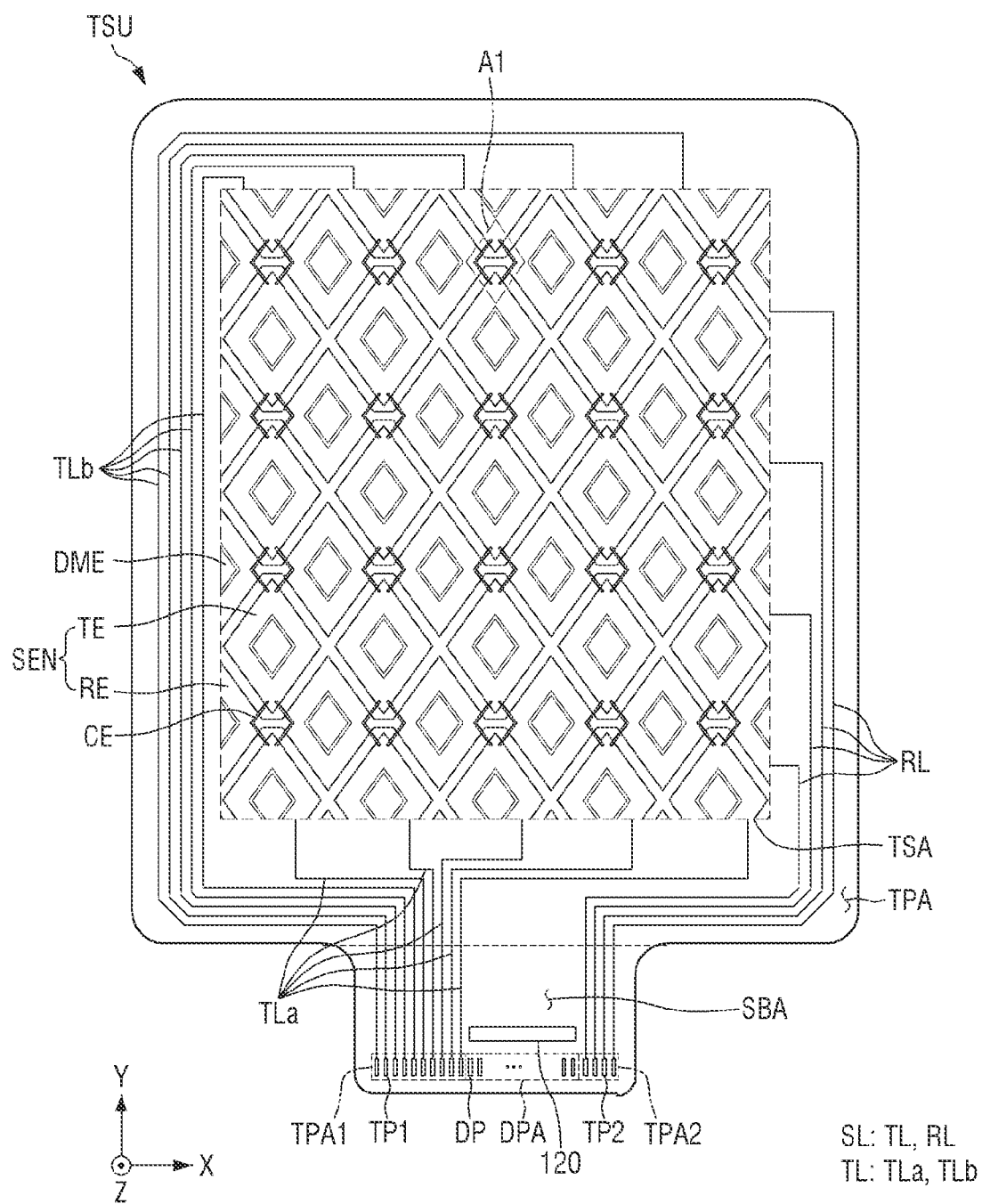
FIG. 20 is a layout view of a touch sensing unit of a display device according to an embodiment.

FIG. 20 is a plan view of the touch sensing unit of the display device according to an embodiment.

Referring to FIG. 20, the touch sensing unit TSU may include the touch sensor area TSA in which a user's touch is detected, and a touch peripheral area TPA disposed around the touch sensor area TSA. The touch sensor area TSA may overlap the display area DA of the display unit DU, and the touch peripheral area TPA may overlap the non-display area NDA of the display unit DU. The touch peripheral area TPA may be disposed around a code pattern.

The touch sensor area TSA may include a plurality of touch electrodes SEN and a plurality of dummy electrodes DME. The touch electrodes SEN may form mutual capacitances or self-capacitances to detect touch input from an object or a person. The touch electrodes SEN may include a plurality of driving electrodes TE and a plurality of sensing electrodes RE.

The driving electrodes TE may be arranged in the X-axis direction and the Y-axis direction. The driving electrodes TE may be spaced apart from one another in the X-axis direction and in the Y-axis direction. The driving electrodes TE adjacent in the Y-axis direction may be electrically connected via bridge electrodes CE.

The plurality of driving electrodes TE may be connected to first touch pad units TP1 via the driving lines TL. The driving lines TL may include lower driving lines TLa and upper driving lines TLb. For example, at least some of the driving electrodes TE disposed on a lower side of the touch sensor area TSA may be connected to the first touch pad unit TP1 through the lower driving lines Tla, and at least some of the driving electrodes TE disposed on the upper side of the touch sensor area TSA may be connected to the first touch pad unit TP1 through the upper driving lines TLb. The lower driving lines Tla may extend to the first touch pad unit TP1 through the lower side of the touch peripheral area TPA. The upper driving lines TLb may extend to the first touch pad unit TP1 through the upper side, the left side, and the lower side of the touch peripheral area TPA. The first touch pad unit TP1 may be connected to the touch driving unit 140 through the circuit board 130.

The bridge electrode CE may be bent at least once. For example, the bridge electrode CE may have a bracket shape ("<" or ">"). However, the planar shape of the bridge electrode CE is not limited thereto. The driving electrodes TE adjacent to each other in the Y-axis direction may be connected by a plurality of bridge electrodes CE, and even in an instance in which any one of the bridge electrodes CE is disconnected, the driving electrodes TE may be stably connected through the remaining bridge electrode CE. The driving electrodes TE adjacent to each other may be connected by two bridge electrodes CE. However, the number of bridge electrodes CE is not limited thereto.

The bridge electrode CE may be disposed on a different layer from the plurality of driving electrodes TE and the plurality of sensing electrodes RE. The sensing electrodes RE adjacent to each other in the X-axis direction may be electrically connected through a connection portion disposed on the same layer as the plurality of driving electrodes TE or the plurality of sensing electrodes RE, and the driving electrodes TE adjacent in the Y-axis direction may be electrically connected through the bridge electrode CE disposed on a different layer from the plurality of driving electrodes TE or the plurality of sensing electrodes RE. Accordingly, although the bridge electrode CE overlaps the plurality of sensing electrodes RE in the Z-axis direction, the plurality of driving electrodes TE and the plurality of sensing electrodes RE may be insulated from each other. Mutual capacitance may be formed between the driving electrode TE and the sensing electrode RE.

The plurality of sensing electrodes RE may extend in the X-axis direction and may be spaced apart from one another in the Y-axis direction. The plurality of sensing electrodes RE may be arranged in the X-direction and the Y-axis direction, and the sensing electrodes RE adjacent in the X-axis direction may be electrically connected through the connection portion.

The plurality of sensing electrodes RE may be connected to the second touch pad unit TP2 through sensing lines RL. For example, some of the sensing electrodes RE disposed on the right side of the touch sensor area TSA may be connected to the second touch pad unit TP2 through the sensing lines RL. The sensing lines RL may extend to the second touch pad unit TP2 through the right side and the lower side of the touch peripheral area TPA. The second touch pad unit TP2 may be connected to the touch driving unit 140 through the circuit board 130.

Each of the plurality of dummy electrodes DME may be surrounded by the driving electrode TE or the sensing electrode RE. Each of the dummy electrodes DME may be insulated by being spaced apart from the driving electrode TE or the sensing electrode RE. Accordingly, the dummy electrode DME may be electrically floating.

The display pad area DPA, the first touch pad area TPA1, and the second touch pad area TPA2 may be disposed at edges of the sub-area SBA. The display pad area DPA, the first touch pad area TPA1, and the second touch pad area TPA2 may be electrically connected to the circuit board 130 using a low-resistance high-reliability material such as, for example, an anisotropic conductive film or SAP.

The first touch pad area TPA1 may be disposed on one side of the display pad area DPA, and may include a plurality of first touch pad units TP1. The plurality of first touch pad units TP1 may be electrically connected to the touch driving unit 140 disposed on the circuit board 130. The plurality of first touch pad units TP1 may supply a touch driving signal to the plurality of driving electrodes TE through the plurality of lower driving lines Tla.

The second touch pad area TPA2 may be disposed on the other side of the display pad area DPA, and may include a plurality of second touch pad units TP2. The plurality of second touch pad units TP2 may be electrically connected to the touch driving unit 140 disposed on the circuit board 130. The touch driving unit 140 may receive a touch sensing signal through a plurality of sensing lines RL connected to the plurality of second touch pad units TP2, and may detect a change in mutual capacitance between the driving electrode TE and the sensing electrode RE.

For example, in an embodiment, the touch driving unit 140 may provide a touch driving signal to each of the plurality of driving electrodes TE and the plurality of sensing electrodes RE, and may receive a touch sensing signal from each of the plurality of driving electrodes TE and the plurality of sensing electrodes RE. The touch driving unit 400 may detect charge variation in each of the plurality of driving electrodes TE and the plurality of sensing electrodes RE based on the touch sensing signal.

Figure 21:
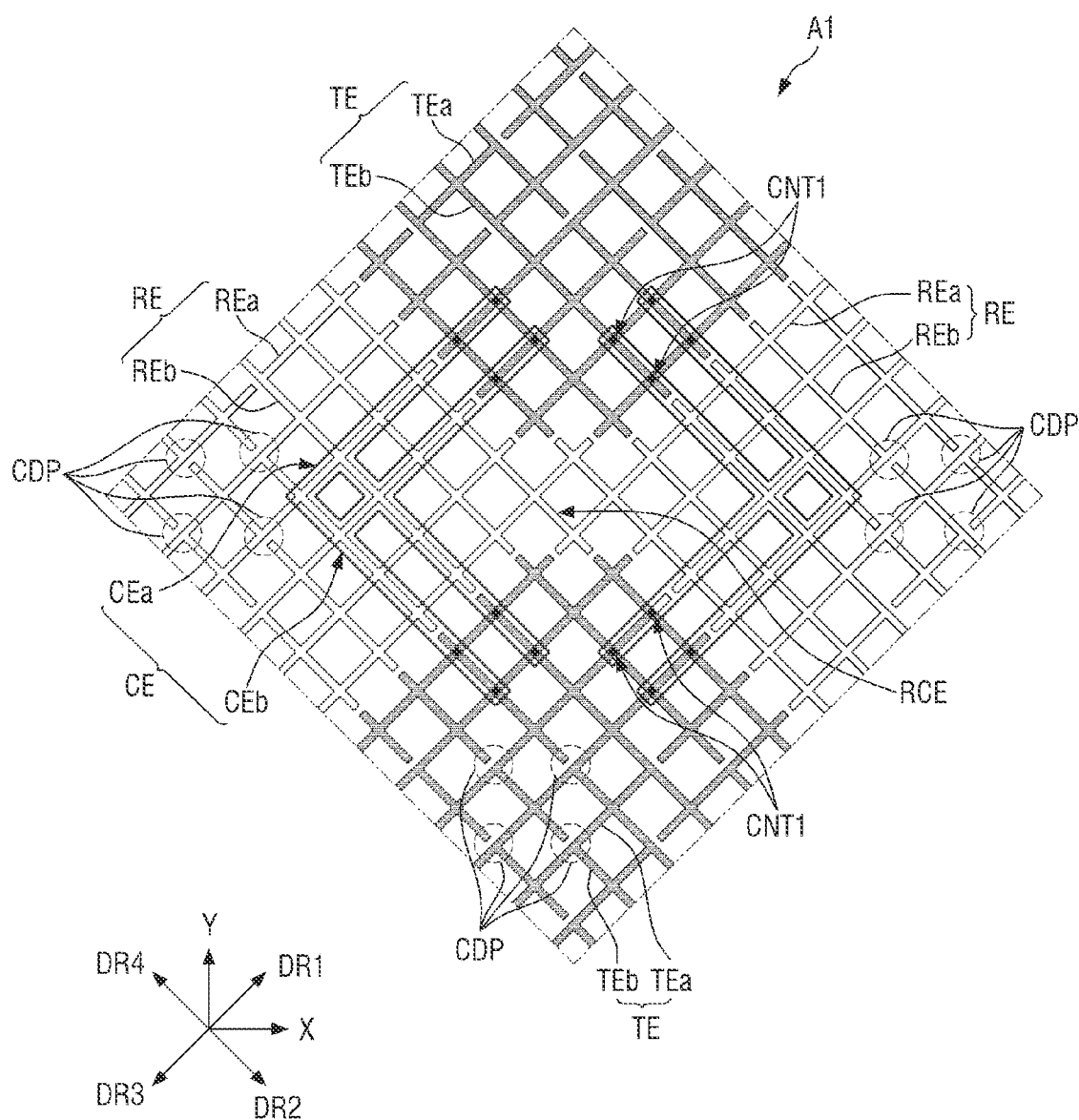
FIG. 21 is an enlarged layout view of portion A1 shown in FIG. 20 according to an embodiment.
Figure 22:
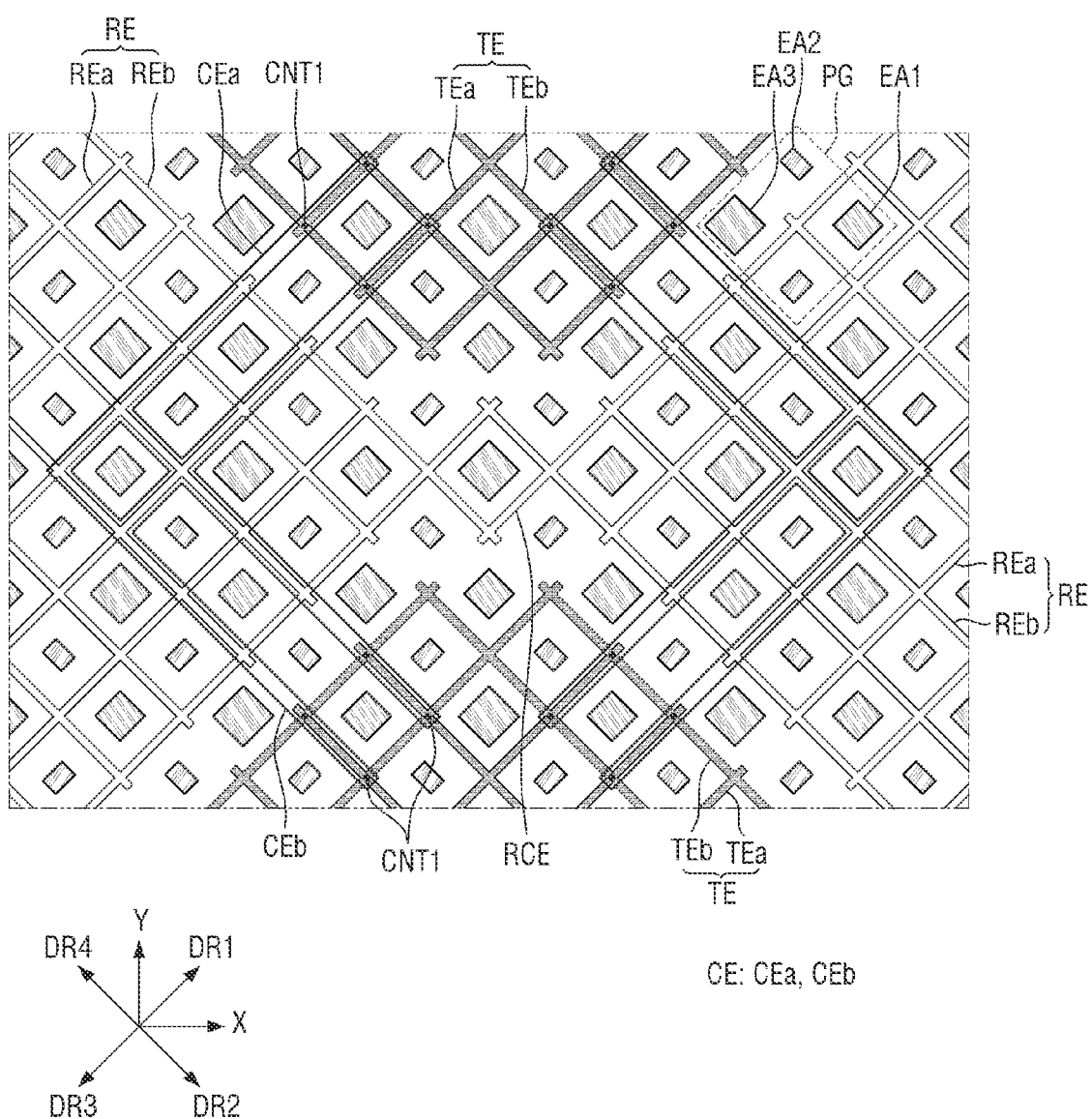
FIG. 22 is an enlarged layout view showing in detail a part of portion A1 shown in FIG. 21 according to an embodiment.

FIG. 21 is an enlarged view of portion A1 of FIG. 20 according to an embodiment. FIG. 22 is an enlarged view showing in detail a part of portion A1 shown in FIG. 21 according to an embodiment.

Referring to FIGS. 21 and 22, the plurality of driving electrodes TE, the plurality of sensing electrodes RE, and the plurality of dummy electrodes DME may be disposed in the same layer and may be spaced apart from one another.

The driving electrodes TE may be arranged in the X-axis direction and the Y-axis direction. The driving electrodes TE may be spaced apart from one another in the X-axis direction and in the Y-axis direction. The driving electrodes TE adjacent in the Y-axis direction may be electrically connected via bridge electrodes CE.

The plurality of sensing electrodes RE may extend in the X-axis direction and may be spaced apart from one another in the Y-axis direction. The plurality of sensing electrodes RE may be arranged in the X-axis direction and the Y-axis direction. The sensing electrodes RE adjacent in the X-axis direction may be electrically connected through a connection portion RCE. For example, the connection portion RCE of the sensing electrodes RE may be disposed within the shortest distance of a corresponding pair of adjacent driving electrodes TE.

A plurality of bridge electrodes CE may be disposed in a different layer from the driving electrodes TE and the sensing electrodes RE. Each of the bridge electrodes CE may include first and second portions CEa and CEb. For example, the first portion CEa of each of the bridge electrodes CE may be connected to a driving electrode TE disposed on one side via a first contact hole CNT1 to extend in a third direction DR3. The second portion CEb of each of the bridge electrodes CE may be bent from the first portion CEa of the corresponding bridge electrode CE to extend in a second direction DR2, in an area that overlaps a sensing electrode SE, and may be connected to a driving electrode TE disposed on the other side via the first contact hole CNT1. Hereinafter, the first direction DR1 may be a direction between the X-axis direction and the Y-axis direction, the second direction DR2 may be a direction between a direction opposite to the Y-axis direction and the X-axis direction, the third direction DR3 may be a direction opposite to the first direction DR1, and the fourth direction DR4 may be a direction opposite to the second direction DR2.

Accordingly, each of the plurality of bridge electrodes CE may connect a pair of adjacent driving electrodes TE in the Y-axis direction.

For example, the plurality of driving electrodes TE, the plurality of sensing electrodes RE, and the plurality of dummy electrodes DME may form a mesh or fishnet shape in a plan view. The plurality of driving electrodes TE, the plurality of sensing electrodes RE, and the plurality of dummy electrodes DME may surround the respective first, second, and third emission areas EA1, EA2, and EA3 of a pixel group PG. Thus, in an embodiment, the driving electrodes TE, the sensing electrodes RE, and the dummy electrodes DME do not overlap the first to third emission areas EA1, EA2, and EA3. Also, in an embodiment, the bridge electrodes BE do not overlap the first to third emission areas EA1, EA2, and EA3. Accordingly, the display device 10 can prevent the luminance of light emitted from the first to third emission areas EA1, EA2, and EA3 from being lowered by the touch sensing unit TSU, or may reduce such an occurrence.

Each of the plurality of driving electrodes TE may include a first portion TEa extending in the first direction DR1 and a second portion TEb extending in the second direction DR2. Each of the plurality of sensing electrodes RE may include a first portion REa extending in the first direction DR1 and a second portion REb extending in the second direction DR2.

At least some touch electrodes SEN may include a code pattern CDP. At least some driving electrodes TE and at least some sensing electrodes RE may include a code pattern CDP. The code pattern CDP may include a plurality of code patterns which are cut according to a specific criterion and thus may have position information. The plurality of code patterns may correspond to preset data code values. For example, the plurality of code patterns may be provided by cutting at least one of a plurality of stems extending from intersections of at least some touch electrodes SEN, but the disclosure is not limited thereto. The plurality of stems of at least some touch electrodes SEN may extend in the first to fourth directions DR1, DR2, DR3, and DR4 from the intersections, and the stem extending in one of the first to fourth directions DR1, DR2, DR3, and DR4 may be cut. The cutting direction of the stem may correspond to a preset data code value which constitutes position information.

A plurality of pixels may include a first sub-pixel, a second sub-pixel, and a third sub-pixel, and each of the first to third sub-pixels may include first to third emission areas EA1, EA2, and EA3. For example, the first emission area EA1 may emit light of a first color (e.g., red light), the second emission area EA2 may emit light of a second color (e.g., green light), and the third emission area EA3 may emit light of a third color (e.g., blue light). However, the disclosure is not limited thereto.

One pixel group PG may include one first emission area EA1, two second emission areas EA2, and one third emission area EA3 for providing a black-and-white or grayscale image. That is, the black-and-white or grayscale image may be provided by a combination of light emitted from one first emission area E1, light emitted from two second emission areas E2, and light emitted from one third emission area E3.

Figure 23:
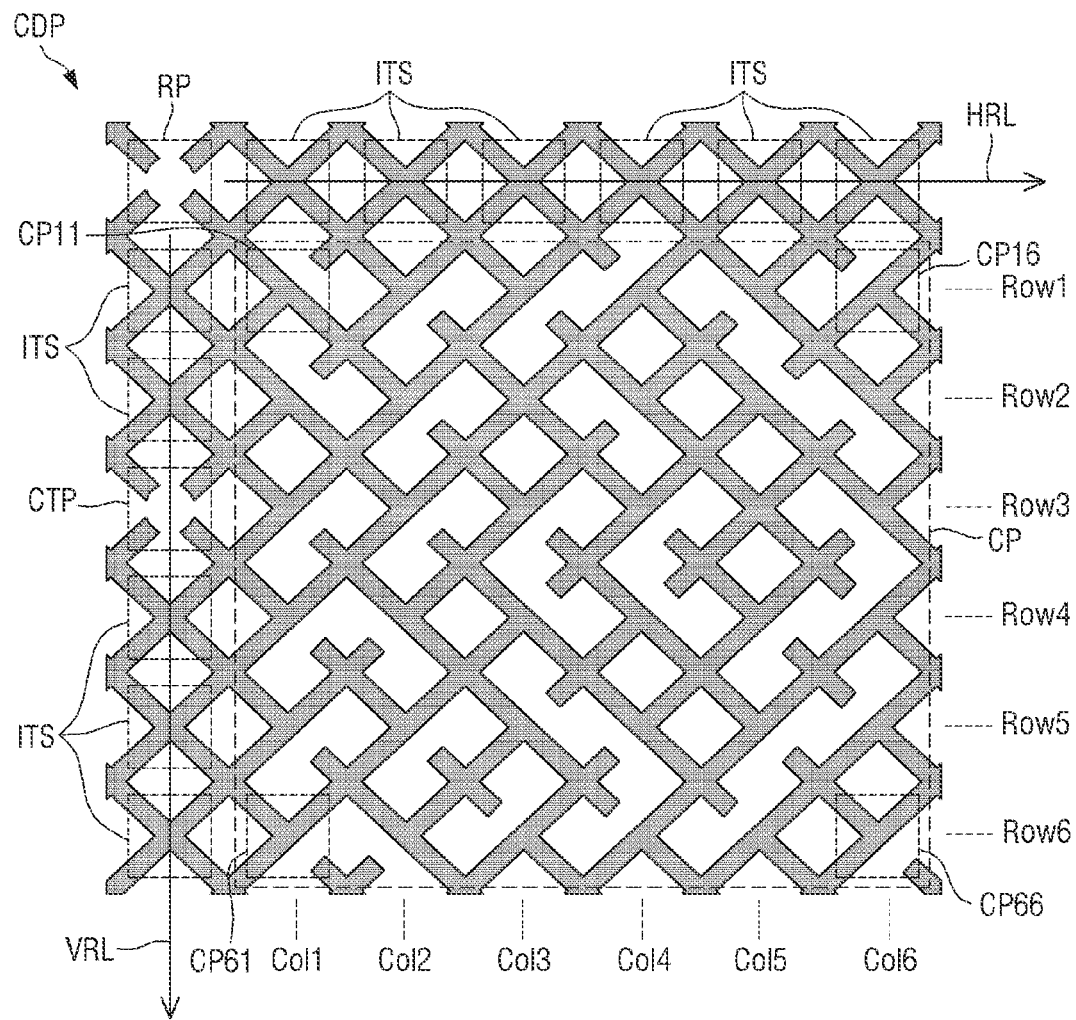
FIG. 23 is a view showing an example of a code pattern in a display device according to an embodiment.

FIG. 23 is a view showing an example of a code pattern in a display device according to an embodiment. FIG. 24 is a diagram showing data codes corresponding to the code pattern of FIG. 23 according to an embodiment.

Referring to FIGS. 23 and 24, a plurality of touch electrodes SEN may form a mesh or fishnet shape in a plan view. Sides of a minimum unit of the touch electrodes SEN may cross each other in the first direction DR1 and in the second direction DR2. At least some touch electrodes SEN may include a code pattern CDP. At least some driving electrodes TE and at least some sensing electrodes RE may include a code pattern CDP.

The code pattern CDP may include a reference point RP, a first reference line HRL, and a plurality of code patterns CP.

The reference point RP may be an identification reference for the code pattern CDP. For example, the reference point RP may correspond to an area obtained by cutting an intersection of at least some touch electrodes SEN. For example, the reference point RP may be disposed on the upper left side of the code pattern CDP, but is not limited thereto.

The first reference line HRL may extend in the X-axis direction from the reference point RP. The first reference line HRL may be defined by connecting a plurality of intersections ITS disposed in the X-direction of the reference point RP. For example, when the first reference line HRL is defined by connecting six intersections ITS, the plurality of code patterns CP may be arranged along six columns with six intersections ITS.

The second reference line VRL may extend in the Y-axis direction from the reference point RP. The second reference line VRL may be defined by connecting a plurality of intersections ITS disposed in the Y-axis direction of the reference point RP and a cutout portion CTP disposed between the intersections ITS. For example, the second reference line VRL may be defined by connecting two intersections ITS, one cutout portion CTP, and three intersections ITS. The plurality of code patterns CP may be arranged along six rows with five intersections ITS and one cutout portion CTP.

The plurality of code patterns CP may be disposed in an area defined by the first reference line HRL and the second reference line VRL. A tilt or rotation angle of the plurality of code patterns CP with respect to a camera may be detected by the first reference line HRL and the second reference line VRL. For example, when the first reference line HRL is defined by connecting six intersections ITS and the second reference line VRL is defined by connecting two intersections ITS, one cutout portion CTP, and three intersections ITS, the plurality of code patterns CP may be arranged in a 6-by-6 matrix.

The plurality of code patterns CP may be cut according to a specific criterion and may have position information. The plurality of code patterns CP may correspond to preset data code values DC. For example, the plurality of code patterns CP may each be provided by cutting one of a plurality of stems extending from intersections of at least some touch electrodes SEN. The plurality of stems of at least some touch electrodes SEN may extend in the first to fourth directions DR1, DR2, DR3, and DR4 from the intersections, and the stem extending in one of the first to fourth directions DR1, DR2, DR3, and DR4 may be cut. The cutting direction of the stem may correspond to a preset data code value DC which constitutes position information. For example, the code pattern CP arranged in the $m^{th}$ row and the $n^{th}$ column may correspond to the data code value DC arranged in the $m^{th}$ row and the $n^{th}$ column.

For example, the code pattern CP obtained by cutting the stem in the first direction DR1 may correspond to a data code value DC of [00]. The code pattern CP obtained by cutting a stem in the second direction DR2 may correspond to a data code value DC of [01]. The code pattern CP obtained by cutting a stem in the third direction DR3 may correspond to a data code value DC of [10]. The code pattern CP obtained by cutting a stem in the fourth direction DR4 may correspond to a data code value DC of [11].

An $11^{th}$ code pattern CP11 placed in the first row Row1 and the first column Col1 may be provided by cutting the stem in the first direction DR1 and an $11^{th}$ data code DC11 may have a value of [00]. A $61^{st}$ code pattern CP61 placed in the sixth row Row6 and the first column Col1 may be provided by cutting the stem in the second direction DR2 and a $61^{st}$ data code DC61 may have a value of [01]. A $62^{nd}$ code pattern CP62 placed in the sixth row Row6 and the second column Col2 may be provided by cutting the stem in the third direction DR3 and a $62^{nd}$ data code DC62 may have a value of [10]. A $16^{th}$ code pattern CP16 placed in the first row Row1 and the sixth column Col6 may be provided by cutting the stem in the fourth direction DR4 and a $16^{th}$ data code DC16 may have a value of [11].

The plurality of code patterns CP may further include a conducting pattern in which a plurality of stems extending from the intersection are not cut. The conducting pattern may not have a data code value DC (Null). The conducting pattern may be disposed at a suitable position such that the plurality of touch electrodes SEN normally perform a touch operation. The plurality of code patterns CP include the conducting pattern, thus preventing or reducing deterioration of the touch electrodes SEN. For example, a $32^{nd}$ code pattern CP 32 placed in the third row Row3 and the second column Col2 may be a conducting pattern, and a $32^{nd}$ data code DC32 may not have a value.

The display device 10 may include the plurality of code patterns CP provided to at least some touch electrodes SEN and may receive a touch input from a touch input device, such as the electronic pen 2. The plurality of code patterns CP may be cut according to a specific criterion and thus may have position information. The code patterns CP and preset data code values DC may have a one-to-one correspondence. Accordingly, the display device 10 may receive coordinate data generated using the data code values DC without performing complicated computations and corrections, thus reducing cost and power consumption and increasing the efficiency of a driving process. Also, the display device 10 includes the plurality of code patterns CP provided to at least some touch electrodes SEN and thus can be applied to any electronic device having a touch function without being limited in size.

Figure 25:
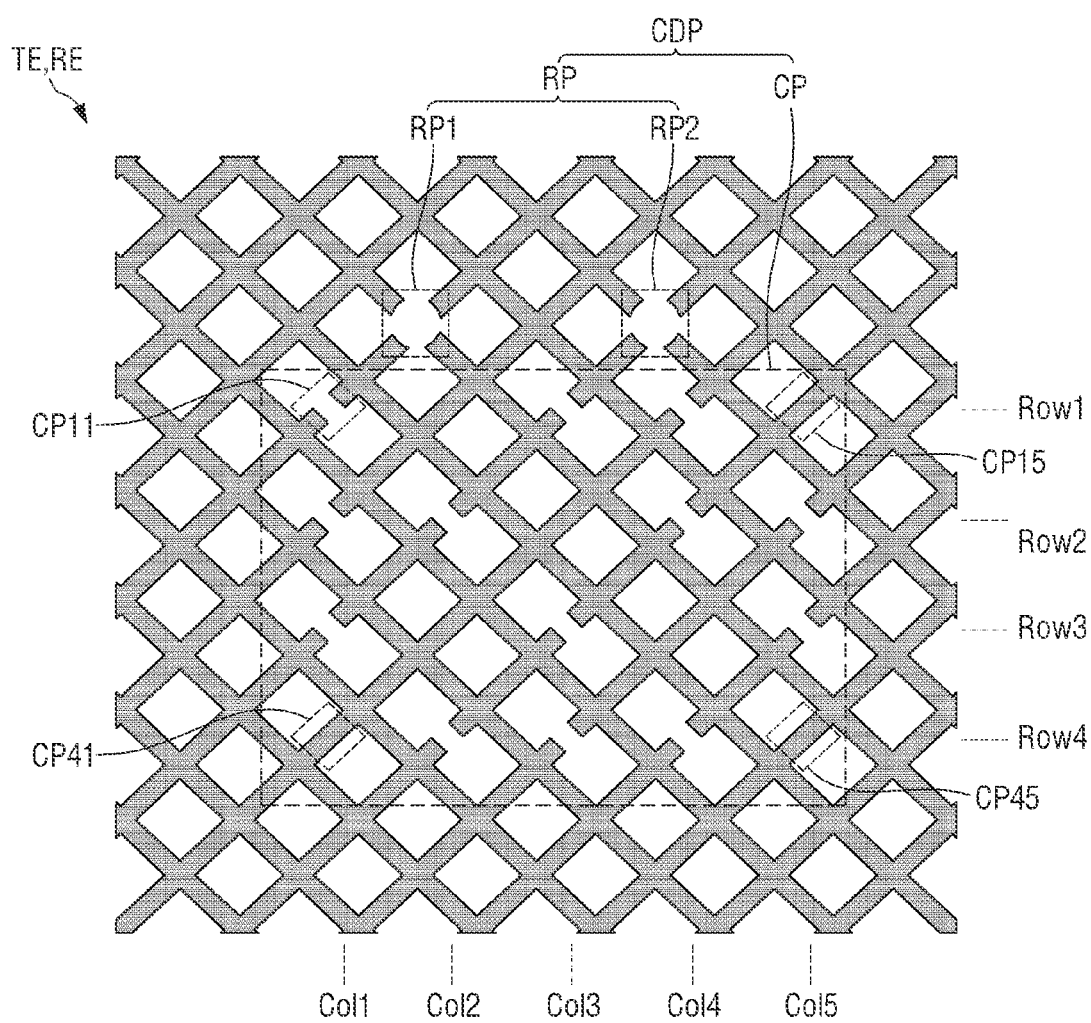
FIG. 25 is a view showing another example of a code pattern in a display device according to an embodiment.

FIG. 25 is a view showing another example of a code pattern in a display device according to an embodiment. FIG. 26 is a diagram showing data codes corresponding to the code pattern of FIG. 25 according to an embodiment.

Referring to FIGS. 25 and 26, a plurality of touch electrodes SEN may form a mesh or fishnet shape in a plan view. Sides of a minimum unit of the touch electrodes SEN may cross each other in the first direction DR1 and in the second direction DR2. At least some touch electrodes SEN may include a code pattern CDP. At least some driving electrodes TE and at least some sensing electrodes RE may include a code pattern CDP.

The code pattern CDP may include a reference point RP and a plurality of code patterns CP.

The reference point RP may be an identification reference for the code pattern CDP. For example, the reference point RP may correspond to an area obtained by cutting an intersection of at least some touch electrodes SEN. The reference point RP may include a first reference point RP1 and a second reference point RP2. For example, the first and second reference points RP1 and RP2 may be disposed apart from each other on an upper portion of the plurality of code patterns CP, but the disclosure is not limited thereto.

The plurality of code patterns CP may be disposed in a preset area based on the first and second reference points RP1 and RP2. A tilt or rotation angle of the plurality of code patterns CP with respect to a camera may be detected by the first and second reference points RP1 and RP2. For example, when the first and second reference points RP1 and RP2 are disposed apart from each other on a specific row, the plurality of code patterns CP may be arranged in an m-by-n matrix from the row following the row on which the first and second reference points RP1 and RP2 are disposed.

The plurality of code patterns CP may be cut according to a specific criterion and may have position information. The plurality of code patterns CP may correspond to preset data code values DC. For example, the plurality of code patterns CP may include some uncut sides and some cut sides among a plurality of sides forming a mesh shape. Here, a side may be cut at its central portion, but the position at which the side is cut is not limited thereto. The presence of a cut side may correspond to a preset data code value DC that constitutes position information. For example, a code pattern CP arranged in the $m^{th}$ row and the $n^{th}$ column may correspond to a data code value DC arranged in the $m^{th}$ row and the $n^{th}$ column. For example, a code pattern CP including an uncut side may correspond to a data code value DC of [0]. A code pattern CP including a cut side may correspond to a data code value DC of [1].

An $11^{th}$ code pattern CP11 placed in the first row Row1 and the first column Col1 may include a cut side and an $11^{th}$ data code DC11 may have a value of [1]. A $45^{th}$ code pattern CP45 placed in the fourth row Row4 and the fifth column Col5 may include an uncut side and a $45^{th}$ data code DC45 may have a value of [0].

Data code values DC arranged in some rows may constitute first data Data1 of coordinate data, and data code values DC arranged in other rows may constitute second data Data2 of the coordinate data. For example, the first data Data1 may correspond to an X-axis coordinate of a touch position and the second data Data2 may correspond to a Y-axis coordinate of the touch position. However, examples of the first and second data Data1 and Data2 are not limited thereto.

For example, data code values DC arranged in the first rows Row1 and the second row Row2 may constitute first data Data1 of coordinate data, and data code values DC arranged in the third row Row3 and the fourth row Row4 may constitute second data Data2 of the coordinate data. Accordingly, the plurality of code patterns CP may be converted into corresponding data code values DC, and the coordinate data may be rapidly generated based on the data code values DC without performing complicated computations and corrections.

The display device 10 may include the plurality of code patterns CP provided to at least some touch electrodes SEN and may receive a touch input from a touch input device, such as a smart pen. The plurality of code patterns CP may be cut according to a specific criterion and thus may have position information. The code patterns CP and preset data code values DC may have a one-to-one correspondence. Accordingly, the display device 10 may receive coordinate data generated using the data code values DC without performing complicated computations and corrections, thus reducing cost and power consumption and increasing the efficiency of a driving process. Also, the display device 10 includes the plurality of code patterns CP provided to at least some touch electrodes SEN and thus can be applied to any electronic device having a touch function without being limited in size.

Figure 27:
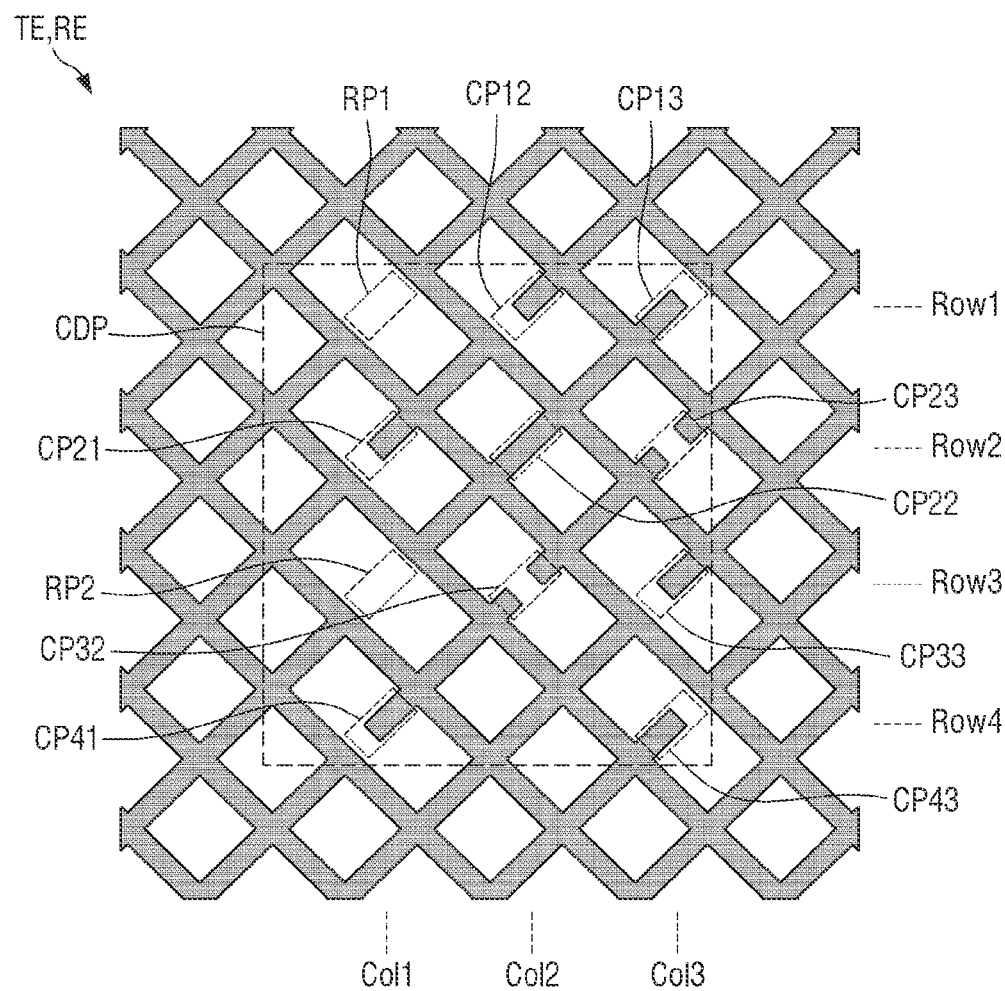
FIG. 27 is a view showing another example of a code pattern in a display device according to an embodiment.
Figure 27:
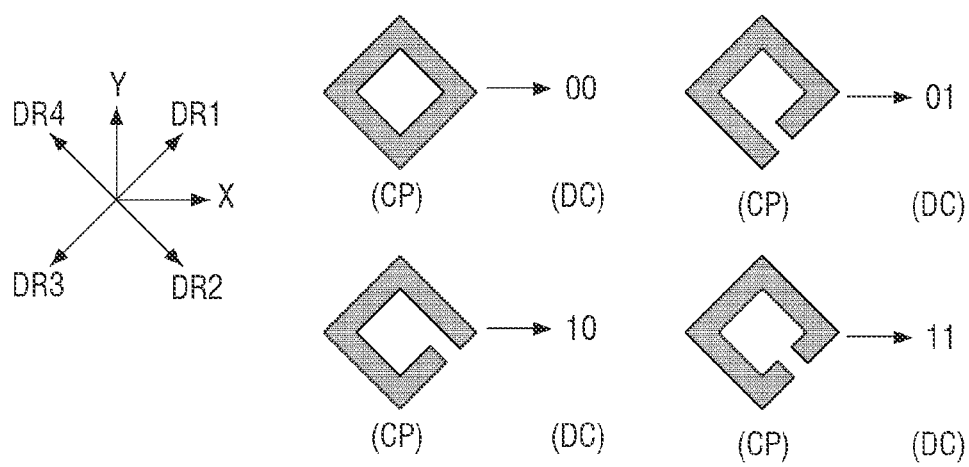

FIG. 27 is a view showing another example of a code pattern in a display device according to an embodiment. FIG. 28 is a diagram showing data codes corresponding to the code pattern of FIG. 27 according to an embodiment.

Referring to FIGS. 27 and 28, a plurality of touch electrodes SEN may form a mesh or fishnet shape in a plan view. Sides of a minimum unit of the touch electrodes SEN may cross each other in the first direction DR1 and in the second direction DR2. At least some touch electrodes SEN may include a code pattern CDP. At least some driving electrodes TE and at least some sensing electrodes RE may include a code pattern CDP.

The code pattern CDP may include a reference point RP and a plurality of code patterns CP.

The reference point RP may be an identification reference for the code pattern CDP. For example, the reference point RP may correspond to an area in which all sides forming the mesh shape are cut. The reference point RP may include a first reference point RP1 and a second reference point RP2. Each of the first and second reference points RP1 and RP2 may be disposed within the rows and columns in which the plurality of code patterns CP are arranged. For example, the code pattern CDP is arranged in a 4-by-3 matrix, the first reference point RP1 may be placed in the first row Row1 and the first column Col1, the second reference point RP2 may be placed in the third row Row3 and the first column Col1, and the plurality of code patterns CP may be arranged in the remaining rows and columns. Arrangement positions of the reference point RP and the code patterns CP are not limited thereto.

The plurality of code patterns CP may be disposed in a preset area based on the first and second reference points RP1 and RP2. A tilt or rotation angle of the plurality of code patterns CP with respect to a camera may be detected by the first and second reference points RP1 and RP2.

The plurality of code patterns CP may be cut according to a specific criterion and thus may have position information. The plurality of code patterns CP may correspond to preset data code values DC. For example, the plurality of code patterns CP may be provided by cutting particular portions of sides that form a mesh shape. The position at which each side is cut may correspond to a preset data code value DC constituting position information. For example, a code pattern CP arranged in the $m^{th}$ row and the $n^{th}$ column may correspond to a data code value DC arranged in the $m^{th}$ row and the $n^{th}$ column.

For example, an uncut code pattern CP may correspond to a data code value DC of [00]. A code pattern CP obtained by cutting a lower portion of a side extending in the first direction DR1 may correspond to a data code value DC of [01]. A code pattern CP obtained by cutting an upper portion of a side extending in the first direction DR1 may correspond to a data code value DC of [10]. A code pattern CP obtained by cutting a central portion of a side extending in the first direction DR1 may correspond to a data code value DC of [11].

A $22^{nd}$ code pattern CP22 placed in the second row Row2 and the second column Col2 may not be cut, and a $22^{nd}$ data code DC22 may have a value of [00]. A $12^{th}$ code pattern CP12 placed in the first row Row1 and the second column Col2 may have a side which is cut at a lower portion thereof and a $12^{th}$ data code DC12 may have a value of [01]. A $13^{th}$ code pattern CP13 placed in the first row Row1 and the third column Col3 may have a side which is cut at an upper portion thereof and a 13$^{th}$ data code DC13 may have a value of [10]. A 23$^{rd}$ code pattern CP23 placed in the second row Row2 and the third column Col3 may have a side which is cut at a central portion thereof and a 23$^{rd}$ data code DC23 may have a value of [11].

Data code values DC arranged in some rows may constitute first data Data1 of coordinate data, and data code values DC arranged in other rows may constitute second data Data2 of the coordinate data. For example, the first data Data1 may correspond to an X-axis coordinate of a touch position and the second data Data2 may correspond to a Y-axis coordinate of the touch position. However, examples of the first and second data Data1 and Data2 are not limited thereto.

For example, data code values DC arranged in the first row Row1 and the second row Row2 may constitute first data Data1 of coordinate data, and data code values DC arranged in the third row Row3 and the fourth row Row4 may constitute second data Data2 of the coordinate data. Accordingly, the plurality of code patterns CP may be converted into corresponding data code values DC, and the coordinate data may be rapidly generated based on the data code values DC without performing complicated computations and corrections.

The display device 10 may include the plurality of code patterns CP provided to at least some touch electrodes SEN and may receive a touch input from a touch input device, such as a smart pen. The plurality of code patterns CP may be cut according to a specific criterion and thus may have position information. The code patterns CP and preset data code values DC may have a one-to-one correspondence. Accordingly, the display device 10 may receive coordinate data generated using the data code values DC without performing complicated computations and corrections, thus reducing cost and power consumption and increasing the efficiency of a driving process. Also, the display device 10 includes the plurality of code patterns CP provided to at least some touch electrodes SEN and thus can be applied to any electronic device having a touch function without being limited in size. \

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

According to embodiments of the present disclosure, an electronic pen, a method of driving the same, and a display device generate a virtual code pattern based on a code pattern, and thus can recognize the code pattern even when the electronic pen detects a part of the code pattern in a part of a detection area. However, the effects of embodiments of the present disclosure are not limited thereto.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed:

1. An electronic pen, comprising:
a projector configured to generate a virtual code pattern;
a light-emitting unit configured to emit light to a detection area;
a light-receiving unit configured to detect light reflected from the detection area; and
a code processor configured to control the projector, the light-emitting unit, and the light-receiving unit,
wherein the code processor is configured to, when a code pattern is detected in a portion of the detection area, generate the virtual code pattern, which corresponds to a remaining portion of the detection area, and
the projector is configured to output the virtual code pattern to the remaining portion of the detection area.

2. The electronic pen of claim 1,
wherein the light-receiving unit is configured to output code pattern image data to the code processor, the code pattern image data corresponding to the code pattern in the portion of the detection area and having a plurality of rows and a plurality of columns.

3. The electronic pen of claim 2,
wherein the code processor is configured to calculate first data code values based on the code pattern image data, the first data code values corresponding to the portion of the detection area and having a plurality of rows and a plurality of columns.

4. The electronic pen of claim 3, further comprising:
a memory comprising a plurality of data code groups,
wherein each of the plurality of data code groups includes data code values having a plurality of rows and a plurality of columns.

5. The electronic pen of claim 4,
wherein the code processor is configured to detect a data code group including the first data code values from among the plurality of data code groups.

6. The electronic pen of claim 5,
wherein the code processor is configured to calculate data code values in the detected data code group, except for the first data code values, as second data code values, and generate the virtual code pattern based on the second data code values.

7. The electronic pen of claim 4,
wherein the first data code values comprise data code values in at least one of the plurality of rows of the first data code values and data code values in at least one of the plurality of columns of the first data code values.

8. The electronic pen of claim 1,
wherein the light-receiving unit is configured to detect light reflected from a re-detection area that comprises the code pattern of the portion of the detection area and the virtual code pattern of the remaining portion of the detection area.

9. The electronic pen of claim 8,
wherein the code processor is configured to detect a data code value from the re-detection area, based on another code pattern obtained by combining the code pattern and the virtual code pattern.

10. The electronic pen of claim 8,
wherein the light-emitting unit is configured to emit infrared light.

11. The electronic pen of claim 10,
wherein the projector is configured to emit infrared light.

12. A display device comprising:
a display panel comprising a code pattern comprising a plurality of sub-code patterns and a peripheral area disposed around the code pattern; and
an electronic pen configured to emit light to the code pattern of the display panel, detect light reflected from the code pattern, and recognize position information according to sub-code patterns detected from the code pattern,
wherein the electronic pen comprises:
a code processor configured to, when sub-code patterns among the plurality of sub-code patterns are detected in a portion of a detection area which overlaps at least a part of the code pattern, generate a virtual code pattern corresponding to a remaining portion of the detection area; and
a projector configured to output the virtual code pattern to the remaining portion of the detection area.

13. The display device of claim 12, wherein the electronic pen further comprises:
a light-receiving unit configured to detect light reflected from the detection area,
wherein the light-receiving unit is configured to detect light reflected from a re-detection area that comprises the code pattern of the portion of the detection area and the virtual code pattern of the remaining portion of the detection area, and
the code processor is configured to detect a data code value from the re-detection area, based on another code pattern obtained by combining the code pattern and the virtual code pattern.

14. A method of driving an electronic pen, comprising:
emitting light to a detection area and detecting light reflected from the detection area;
when detecting a code pattern in a portion of the detection area, generating a virtual code pattern corresponding to a remaining portion of the detection area; and
outputting the virtual code pattern to the remaining portion of the detection area.

15. The method of claim 14, further comprising:
outputting code pattern image data corresponding to the code pattern in the portion of the detection area, wherein the code pattern image data has a plurality of rows and a plurality of columns.

16. The method of claim 15, further comprising:
calculating first data code values based on the code pattern image data, the first data code values corresponding to the portion of the detection area and having a plurality of rows and a plurality of columns.

17. The method of claim 16,
wherein each of a plurality of data code groups includes data code values having a plurality of rows and a plurality of columns, and the method further comprises:
detecting a data code group including the first data code values from among the plurality of data code groups.

18. The method of claim 17, further comprising:
calculating data code values in the detected data code group, except for the first data code values, as second data code values; and
generating the virtual code pattern based on the second data code values.

19. The method of claim 14, further comprising:
detecting light reflected from a re-detection area that comprises the code pattern of the portion of the detection area and the virtual code pattern of the remaining portion of the detection area.

20. The method of claim 19, further comprising:
detecting a data code value from the re-detection area, based on a code pattern obtained by combining the code pattern and the virtual code pattern.

* * * * *